US007937723B2

(12) United States Patent
Weissmueller, Jr. et al.

(10) Patent No.: US 7,937,723 B2
(45) Date of Patent: May 3, 2011

(54) SYSTEM AND METHOD FOR VERIFYING CONTENT DISPLAYED ON AN ELECTRONIC VISUAL DISPLAY BY MEASURING AN OPERATIONAL PARAMETER OF THE ELECTRONIC VISUAL DISPLAY WHILE DISPLAYING THE CONTENT

(75) Inventors: William Robert Weissmueller, Jr., Round Lake Park, IL (US); Ernest Lawrence Tell, St. Paul, MN (US)

(73) Assignee: Automated Media Services, Inc., Allendale, NJ (US)

( * ) Notice: Subject to any disclaimer, the term of this patent is extended or adjusted under 35 U.S.C. 154(b) by 0 days.

(21) Appl. No.: 12/549,139

(22) Filed: Aug. 27, 2009

(65) Prior Publication Data

US 2010/0045681 A1 Feb. 25, 2010

Related U.S. Application Data

(62) Division of application No. 10/265,512, filed on Oct. 3, 2002, now Pat. No. 7,614,065.

(60) Provisional application No. 60/341,626, filed on Dec. 17, 2001.

(51) Int. Cl.
*H04N 9/00* (2006.01)
*H04N 7/16* (2006.01)
*H04N 17/00* (2006.01)
*H04N 17/02* (2006.01)
*G06Q 30/00* (2006.01)
*G06F 3/038* (2006.01)

(52) U.S. Cl. ............... 725/22; 725/9; 725/14; 705/14.4; 705/14.41; 705/14.43; 345/204; 715/962; 348/180; 348/189

(58) Field of Classification Search .................... 725/22, 725/9, 14; 705/14.4, 14.41, 14.43; 345/204; 715/962; 348/180, 189
See application file for complete search history.

(56) References Cited

U.S. PATENT DOCUMENTS 2,626,301 A 1/1953 Hammerly
(Continued)

FOREIGN PATENT DOCUMENTS

BE 1011839 2/2000
(Continued)

OTHER PUBLICATIONS

"A Truly New Advertising Medium . . . ," Distributed Media Corporation, Jan. 23, 2001.
(Continued)

*Primary Examiner* — Hoang-Vu A Nguyen-Ba
(74) *Attorney, Agent, or Firm* — SNR Denton US LLP

(57) ABSTRACT

One embodiment of a system and method may include communicating visual content via a visual content signal to an electronic visual display for displaying between a start time and an end time. The visual content signal may be displayed between the start and end times, and an operational parameter (e.g., voltage or current) of the electronic visual display may be sensed between the start and end times. An indicator indicative of the sensed operational parameter may be recorded. The recorded indicator provides for verification of the visual content being displayed by the electronic visual display. Signature analysis may be performed on the sensed operational parameter to determine that the visual content signal was properly displayed. In addition, a visual content signal may be uniquely identified based on the signature analysis.

50 Claims, 11 Drawing Sheets

U.S. PATENT DOCUMENTS

| | | | |
|---|---|---|---|
| 2,969,438 A | 1/1961 | Hermann et al. | |
| 3,159,937 A | 12/1964 | Barnes | |
| 3,210,716 A | 10/1965 | Meacham | |
| 3,504,172 A | 3/1970 | Liberman | |
| 3,680,030 A | 7/1972 | Johnson | |
| 4,245,874 A | 1/1981 | Bishop | |
| 4,472,707 A | 9/1984 | Wilensky et al. | |
| 4,489,995 A | 12/1984 | Barr | |
| 4,747,025 A | 5/1988 | Barton | |
| 4,775,857 A * | 10/1988 | Staggs | 345/548 |
| 4,887,401 A | 12/1989 | Gioscia | |
| 4,891,922 A | 1/1990 | Hozer et al. | |
| 4,907,137 A | 3/1990 | Schladitz et al. | |
| 4,916,731 A | 4/1990 | Brisson et al. | |
| 4,961,533 A | 10/1990 | Teller et al. | |
| 5,061,997 A | 10/1991 | Rea et al. | |
| 5,070,666 A | 12/1991 | Looman | |
| 5,172,314 A | 12/1992 | Poland et al. | |
| 5,241,467 A | 8/1993 | Failing et al. | |
| 5,245,534 A | 9/1993 | Waterhouse et al. | |
| 5,309,174 A * | 5/1994 | Minkus | 345/204 |
| 5,321,579 A | 6/1994 | Brown et al. | |
| 5,348,485 A | 9/1994 | Briechle et al. | |
| 5,374,815 A | 12/1994 | Waterhouse et al. | |
| 5,412,416 A | 5/1995 | Nemirofsky | |
| 5,418,328 A | 5/1995 | Nadeau et al. | |
| 5,420,606 A | 5/1995 | Begum et al. | |
| 5,448,226 A | 9/1995 | Failing, Jr. et al. | |
| 5,461,561 A | 10/1995 | Ackerman et al. | |
| 5,467,474 A | 11/1995 | Ackerman et al. | |
| 5,473,832 A | 12/1995 | Briechle et al. | |
| 5,532,465 A | 7/1996 | Waterhouse et al. | |
| 5,543,856 A * | 8/1996 | Rosser et al. | 348/578 |
| 5,553,412 A | 9/1996 | Briechle et al. | |
| 5,555,405 A | 9/1996 | Griesmer et al. | |
| 5,566,353 A | 10/1996 | Cho et al. | |
| 5,572,653 A | 11/1996 | DeTemple et al. | |
| 5,583,487 A | 12/1996 | Ackerman et al. | |
| 5,632,010 A | 5/1997 | Briechle et al. | |
| 5,636,750 A | 6/1997 | Heyl | |
| 5,642,484 A | 6/1997 | Harrison, III et al. | |
| 5,652,845 A | 7/1997 | Arai et al. | |
| 5,670,743 A | 9/1997 | Welch et al. | |
| 5,673,037 A | 9/1997 | Cesar et al. | |
| 5,687,499 A | 11/1997 | Brnjac | |
| 5,703,564 A | 12/1997 | Begum et al. | |
| 5,704,049 A | 12/1997 | Briechle | |
| 5,734,823 A | 3/1998 | Saigh et al. | |
| 5,736,967 A | 4/1998 | Kayser et al. | |
| 5,739,809 A | 4/1998 | McLaughlin et al. | |
| 5,758,064 A | 5/1998 | Zimmerman et al. | |
| 5,761,601 A | 6/1998 | Nemirofsky et al. | |
| 5,797,132 A | 8/1998 | Altwasser | |
| 5,812,985 A | 9/1998 | Failing et al. | |
| 5,818,346 A | 10/1998 | Goodwin, III et al. | |
| 5,828,318 A | 10/1998 | Cesar | |
| 5,864,325 A | 1/1999 | Briechle et al. | |
| 5,887,147 A | 3/1999 | Arai et al. | |
| 5,930,771 A | 7/1999 | Stapp | |
| 5,955,710 A | 9/1999 | DiFranza | |
| 5,963,133 A | 10/1999 | Monjo | |
| 5,977,998 A | 11/1999 | Briechle et al. | |
| 5,983,069 A | 11/1999 | Cho et al. | |
| 5,999,912 A | 12/1999 | Wodarz et al. | |
| 6,016,481 A | 1/2000 | Failing, Jr. et al. | |
| 6,038,545 A | 3/2000 | Mandeberg et al. | |
| 6,038,594 A | 3/2000 | Puente et al. | |
| 6,046,682 A | 4/2000 | Zimmerman et al. | |
| 6,060,993 A | 5/2000 | Cohen | |
| 6,061,039 A | 5/2000 | Ryan et al. | |
| 6,075,576 A | 6/2000 | Tan et al. | |
| 6,076,071 A | 6/2000 | Freeny, Jr. | |
| 6,082,500 A | 7/2000 | Amo et al. | |
| 6,107,936 A | 8/2000 | Zimmerman | |
| 6,108,042 A | 8/2000 | Adams et al. | |
| 6,108,367 A | 8/2000 | Herman et al. | |
| 6,108,637 A | 8/2000 | Blumenau | |
| 6,112,232 A | 8/2000 | Shahar et al. | |
| 6,130,603 A | 10/2000 | Briechle | |
| 6,142,322 A | 11/2000 | Smith et al. | |
| 6,144,944 A | 11/2000 | Kurtzman, II et al. | |
| 6,146,158 A | 11/2000 | Peratoner et al. | |
| 6,148,291 A | 11/2000 | Radican | |
| 6,160,477 A | 12/2000 | Sandelman et al. | |
| 6,173,317 B1 | 1/2001 | Chaddha et al. | |
| 6,181,299 B1 | 1/2001 | Frederick et al. | |
| 6,199,705 B1 | 3/2001 | Portner | |
| 6,202,334 B1 | 3/2001 | Reynolds et al. | |
| 6,208,977 B1 | 3/2001 | Hernandez et al. | |
| 6,215,411 B1 | 4/2001 | Gothard | |
| 6,233,536 B1 | 5/2001 | Zale et al. | |
| 6,236,330 B1 | 5/2001 | Cohen | |
| 6,236,335 B1 | 5/2001 | Goodwin, III | |
| 6,247,090 B1 | 6/2001 | Arai et al. | |
| 6,263,440 B1 | 7/2001 | Pruett et al. | |
| 6,279,278 B1 | 8/2001 | Morris et al. | |
| 6,288,688 B1 | 9/2001 | Hughes et al. | |
| 6,292,827 B1 | 9/2001 | Raz | |
| 6,300,980 B1 | 10/2001 | McGraw et al. | |
| 6,311,213 B2 | 10/2001 | Dawson et al. | |
| 6,311,308 B1 | 10/2001 | Adamec | |
| 6,330,976 B1 | 12/2001 | Dymetman et al. | |
| 6,340,958 B1 | 1/2002 | Cantu et al. | |
| 6,351,776 B1 | 2/2002 | O'Brien et al. | |
| 6,366,914 B1 | 4/2002 | Stern | |
| 6,377,938 B1 | 4/2002 | Block et al. | |
| 6,381,626 B1 | 4/2002 | De Leo et al. | |
| 6,384,736 B1 | 5/2002 | Gothard | |
| 6,388,716 B1 * | 5/2002 | Tsuzuki et al. | 348/687 |
| 6,408,278 B1 | 6/2002 | Carney et al. | |
| 6,424,998 B2 | 7/2002 | Hunter | |
| 6,438,368 B1 | 8/2002 | Phillips et al. | |
| 6,438,882 B1 | 8/2002 | Reynolds | |
| 6,487,457 B1 * | 11/2002 | Hull et al. | 700/17 |
| 6,502,076 B1 | 12/2002 | Smith | |
| 6,535,119 B1 | 3/2003 | Haulk et al. | |
| 6,539,429 B2 | 3/2003 | Rakavy et al. | |
| 6,570,492 B1 | 5/2003 | Peratoner | |
| 6,594,311 B1 | 7/2003 | Pearlstein | |
| 6,648,153 B2 | 11/2003 | Holmes | |
| 6,662,483 B2 | 12/2003 | Reynolds | |
| 6,715,676 B1 | 4/2004 | Janning | |
| 6,716,042 B2 | 4/2004 | Lin et al. | |
| 6,725,460 B1 | 4/2004 | Nishiyama et al. | |
| 6,741,188 B1 | 5/2004 | Miller et al. | |
| 6,748,710 B2 | 6/2004 | Gresham et al. | |
| 6,749,116 B2 | 6/2004 | Massaro | |
| 6,774,812 B2 | 8/2004 | Tada | |
| 6,812,852 B1 | 11/2004 | Cesar | |
| 6,829,854 B2 | 12/2004 | Reynolds | |
| 6,892,650 B2 | 5/2005 | Baloga et al. | |
| 6,947,987 B2 | 9/2005 | Boland | |
| 6,959,471 B2 | 11/2005 | Temple et al. | |
| 6,988,667 B2 | 1/2006 | Stewart et al. | |
| 7,066,435 B2 | 6/2006 | Oddsen, Jr. et al. | |
| 7,084,765 B2 | 8/2006 | Clapper | |
| 7,098,870 B2 | 8/2006 | Wampler et al. | |
| 7,136,906 B2 | 11/2006 | Giacalone, Jr. | |
| 7,155,663 B2 | 12/2006 | Landsman et al. | |
| 7,158,046 B2 | 1/2007 | Cesar et al. | |
| 7,175,034 B2 | 2/2007 | Nook et al. | |
| 7,193,504 B2 | 3/2007 | Carrender et al. | |
| 7,228,341 B2 | 6/2007 | Giacalone, Jr. | |
| 7,242,301 B2 | 7/2007 | August et al. | |
| 7,249,872 B2 | 7/2007 | Ragsdale et al. | |
| 7,262,686 B2 | 8/2007 | Stewart et al. | |
| 7,302,102 B2 | 11/2007 | Reynolds et al. | |
| 7,613,630 B2 | 11/2009 | Wolinsky et al. | |
| 7,614,065 B2 | 11/2009 | Weissmueller, Jr. et al. | |
| 2001/0003846 A1 | 6/2001 | Rowe et al. | |
| 2001/0014876 A1 | 8/2001 | Miyashita | |
| 2001/0020343 A1 | 9/2001 | Reynolds | |
| 2001/0052000 A1 | 12/2001 | Giacalone, Jr. | |
| 2002/0023274 A1 | 2/2002 | Giacalone, Jr. | |
| 2002/0055942 A1 | 5/2002 | Reynolds | |
| 2002/0059743 A1 | 5/2002 | Reynolds | |
| 2002/0073588 A1 | 6/2002 | Reynolds et al. | |

| | | | |
|---|---|---|---|
| 2002/0077896 A1 | 6/2002 | Liu et al. | |
| 2002/0077909 A1* | 6/2002 | Kanojia et al. | 705/14 |
| 2002/0085300 A1 | 7/2002 | Bracken et al. | |
| 2002/0087401 A1 | 7/2002 | Leapman et al. | |
| 2002/0104246 A1 | 8/2002 | Reynolds | |
| 2002/0108330 A1 | 8/2002 | Yu et al. | |
| 2002/0109729 A1 | 8/2002 | Dutta | |
| 2002/0111866 A1 | 8/2002 | Carney et al. | |
| 2002/0120518 A1 | 8/2002 | Carney et al. | |
| 2002/0147987 A1 | 10/2002 | Reynolds | |
| 2002/0178445 A1 | 11/2002 | Eldering et al. | |
| 2002/0190972 A1* | 12/2002 | Ven de Van | 345/204 |
| 2002/0196126 A1 | 12/2002 | Eisenberg et al. | |
| 2003/0051415 A1 | 3/2003 | Remelts et al. | |
| 2003/0055725 A1 | 3/2003 | Lee | |
| 2003/0079391 A1 | 5/2003 | Reynolds et al. | |
| 2003/0095784 A1 | 5/2003 | Gordon | |
| 2003/0115096 A1 | 6/2003 | Reynolds et al. | |
| 2003/0206632 A1 | 11/2003 | Itoh et al. | |
| 2004/0019497 A1 | 1/2004 | Volk et al. | |
| 2004/0035037 A1 | 2/2004 | Reynolds | |
| 2004/0060218 A1 | 4/2004 | Reynolds et al. | |
| 2004/0073484 A1 | 4/2004 | Camporeale et al. | |
| 2004/0086039 A1 | 5/2004 | Reynolds et al. | |
| 2004/0116183 A1 | 6/2004 | Prindle | |
| 2004/0158865 A1 | 8/2004 | Kubler et al. | |
| 2004/0165783 A1 | 8/2004 | Reynolds et al. | |
| 2005/0018768 A1 | 1/2005 | Mabey et al. | |
| 2005/0038645 A1 | 2/2005 | Mabey et al. | |
| 2005/0060745 A1 | 3/2005 | Riedl et al. | |
| 2005/0171843 A1 | 8/2005 | Brazell et al. | |
| 2005/0216339 A1 | 9/2005 | Brazell et al. | |
| 2005/0279257 A1 | 12/2005 | Bettinger | |
| 2006/0074769 A1 | 4/2006 | Looney et al. | |
| 2006/0085262 A1 | 4/2006 | Brazell et al. | |
| 2006/0101521 A1 | 5/2006 | Rabinovitch | |
| 2006/0149631 A1 | 7/2006 | Brazell et al. | |
| 2006/0212346 A1 | 9/2006 | Brazell et al. | |
| 2006/0230416 A1 | 10/2006 | Brazell et al. | |
| 2007/0130023 A1 | 6/2007 | Wolinsky et al. | |
| 2007/0219866 A1 | 9/2007 | Wolf et al. | |

FOREIGN PATENT DOCUMENTS

| | | |
|---|---|---|
| DE | 200 04 924 U1 | 7/2000 |
| EP | 0978814 | 9/2000 |
| EP | 1098288 A1 | 5/2001 |
| EP | 1152614 A2 | 11/2001 |
| FR | 2639410 | 5/1990 |
| FR | 2765018 | 12/1998 |
| TW | 408540 | 11/2000 |
| TW | 412687 | 11/2000 |
| TW | 453087 | 1/2001 |
| WO | WO-01/48581 | 7/2001 |
| WO | WO 01/65531 | 9/2001 |
| WO | WO-2005/050988 A1 | 6/2005 |
| WO | WO-2005/107116 A2 | 11/2005 |

OTHER PUBLICATIONS

"m-cast", Fujitsu Australia Software Technology 2001-2002.
"VideoworX™ POS Screen", Digital Matter Corporation, Info printed May 22, 2002.
"A Captive View," The Delaney Report, Mar. 2001.
"Attention Wal-Mart Shoppers" Forbest Magazine, Apr. 16, 2001.
"Broadband has arrived . . . In a Big Way" DirectWay by Hughes Network Systems, Inc., © 2002.
"BuyMedia.com Unveils Personalization Enhancements to Web based Media Buying Service", Business Wire, Nov. 11, 1999.
"Can Retail Be Media?", Pivot Points, Summer 2001.
Cap ventures—Narrowcasting in Public Spaces—The Outlook For Digital Signage, Sep. 24, 2001.
"Chrysler Drives Away From Focus on TV", The Wall Street Journal, May 31, 2001.
"CyberStar, a Loral Company", Info printed May 22, 2002 (print date).
"Dancast™:The most exciting new advertising medium in a generation?" © 2001.
"Digital Media", IBM Corporation, © 2001.
"Digital Promotions Make Quick Point McDonald's Testing New Technology on its Menus", The Chicago Tribune Archives, Dec. 26, 1997.
"Digital Signage System", ICS Technology Inc., Info printed May 22, 2002.
"Eddie Bauer's Windows Add Electrinics in New Customised Mark" www.financialexpress.com/fe/daily/200011129/efe29023.html, Nov. 29, 2000.
"EPOP—The Extraordinary Promotional Medium", Toppan Printing Company America, Inc., Info printed May 22, 2002.
"EPOP—The Extraordinary Promotional Medium," Toppan Printing Company America, Inc., Jun. 29, 2001 .
Execs: GM may buy TV ad time via Net, Media Electronic, vol. 74, Mar. 13, 2000.
Forbes.com, "Unplugged" Nov. 25, 2002 (Post filing).
"Getting Noticed", S&VC, May 1999.
i-Open Presentation, Jan. 24, 2001.
Imagicast, 2000.
"Immeon/A New Broadband Concept", © 2002.
"In-Store Marketing/advertising solution for Retail", IBM—Digitalmedia Distributor, Dec. 11, 2000.
"Info Touch Technologies", May 8, 2002.
"InfoChannel 3", Scala Broadcast Multimedia, Mar. 2002.
"Introducing an Integrated Media Company," Broadband Broadcasting Network, Inc., 1997-1999.
International Search Report date mailed Sep. 3, 2009; PCT International Application No. PCT/US02/33391.
International Search Report and Written Opinion dated May 5, 2009; PCT International Application No. PCT/US09/33595.
"Is it Prime Time at the Mall? New innovators undeterred by past mall TV flops" ISCS Publications, Oct. 2002.
"Is Promotion a Dirty Word?", Promo, Mar. 1, 2001.
"Jasmine 2000", Fujitsu Limited © 2001.
"Managing the Message", Dynamics Sign Display, Info printed May 22, 2002.
Market Leader Media, Nov. 13, 1998.
"Marketing Waste is a Big Problem—a Survey of Marketing Performance Management", Reveries.com, Apr. 2, 2001.
M.E. Podmolik, "Optimism reigns at online bazaar; Growing pack of services tout savings and efficiency of ad orders"; Advertising Age, vol. 71, Jul. 31, 2000.
"Media", Digital View, 2002.
Media SideStreet Corporation, Jun. 13, 2001.
"NCR DecisionNet™ Elecronic Shelf Labels", NCR Corporation, © 2002.
"Out of Home Video", OOH Video Systems Ltd. © 2001.
"Plasma in Demand" P-O-P & In-Store Marketing, www.SalesAndMarketingMag.com, Oct. 2001.
"Plasma Video Screens Prove Customer Hit in Eddie Bauer Test" In-Store Technology, Feb. 2001.
"POPvideo Player" Maintenance Free Video Advertising by Visual Circuits www.vcircuits.com; Dec. 31, 1998.
"Putting the Snap! Into POP" Creative Marketing Magazine, 1998.
"Remarkable Market Facts About Retail Sign Costs", Gyricon, May 17, 2001.
"Scala—Solutions, Multimedia Messaging to Targeted Audiences", Scala Broadcast Multimedia, Info printed May 22, 2002.
"Services", MyDataVault, © 2002.
SignCast, Jan. 17, 2000.
"Store-Specific Marketing—Promotion Optimization Using Digital Signage", i-Open Solutions, No print date available (most likely printed May 22, 2002).
"Technology Uses "Sight & Sound" to Grab Customers at the Point of Purchase", Point-of-Purchase Magazine, Apr. 2000.
The Sidecast Network, Feb. 23, 1999.
"Trade Promotion: Going for Broke", Promo, Aug. 1, 2001.
"Transcript—Case & Levin", www.pathfinder.com/time/transcript/case-levin/pf.html, Feb. 7, 2000.
Transvision, Oct. 28, 2001 (launch network).
"Turn Browsers Into Buyers", i-Open Solution, Info printed May 22, 2002.
Video Billboard, www.futureproof.com/Video%20Bill%20Board.html, Oct. 2000.

"Video Wall Technology", Easy Systems SA Belgium, © 2001.
"Welcome to Digital Display Corporation", Digital Display Corp Home Page, Info printed May 22, 2002.
"What is a Digital Sign?", Tzero, Dec. 31, 1999.
WSN-women's Supermarket Network, Feb. 27, 2001.
Non-Final Office Action dated Dec. 2, 2005 for U.S. Appl. No. 10/277,218.
Response filed May 2, 2006 to Non-Final Office Action dated Dec. 2, 2005 for U.S. Appl. No. 10/277,218.
Final Office Action dated Jul. 31, 2006 for U.S. Appl. No. 10/277,218.
Notice of Abandonment dated Mar. 8, 2007 for U.S. Appl. No. 10/277,218.
Non-Final Office Action dated Nov. 14, 2007 for U.S. Appl. No. 11/600,498.
Response filed May 14, 2008 to Non-Final Office Action dated Nov. 14, 2007 for U.S. Appl. No. 11/600,498.
Final Office Action dated Aug. 20, 2008 for U.S. Appl. No. 11/600,498.
RCE/Response filed Nov. 20, 2008 to Final Office Action dated Aug. 20, 2008 for U.S. Appl. No. 11/600,498.
Restriction Requirement dated Feb. 19, 2009 for U.S. Appl. No. 11/600,498.
Response filed Mar. 19, 2009 to Restriction Requirement dated Feb. 19, 2009 for U.S. Appl. No. 11/600,498.
Restriction Requirement dated Jun. 4, 2009 for U.S. Appl. No. 11/600,498.
Response filed Jun. 11, 2009 to Restriction Requirement dated Jun. 4, 2009 for U.S. Appl. No. 11/600,498.
Restriction Requirement dated Oct. 22, 2008 for U.S. Appl. No. 10/265,512.
Response filed Nov. 20, 2008 to Restriction Requirement dated Oct. 22, 2008 for U.S. Appl. No. 10/265,512.
Non-Final Office Action dated Feb. 2, 2009 for U.S. Appl. No. 10/265,512.
Interview Summary dated Apr. 27, 2007 for U.S. Appl. No. 10/265,512.
Response filed May 13, 2009 to Non-Final Office Action date mailed Feb. 2, 2009 for U.S. Appl. No. 10/265,512.
Notice of Allowance date mailed Jul. 31, 2009 for U.S. Appl. No. 10/265,512.
Miscellaneous Communication date mailed Aug. 20, 2009 for U.S. Appl. No. 10/265,512.
Amendment after Notice of Allowance (Rule 312) filed Aug. 27, 2009 for U.S. Appl. No. 10/265,512.
Supplemental Response filed Aug. 28, 2009 for U.S. Appl. No. 10/265,512.
Response to Amendment (Rule 312) filed Sep. 3, 2009 for U.S. Appl. No. 10/265,512.
Non-Final Office Action dated Apr. 6, 2007 for U.S. Appl. No. 11/600,635.
Response filed Aug. 2, 2007 to Non-Final Office Action dated Apr. 6, 2007 for U.S. Appl. No. 11/600,635.
Final Office Action dated Nov. 2, 2007 for U.S. Appl. No. 11/600,635.
RCE/Response filed May 2, 2008 to Final Office Action dated Nov. 2, 2007 for U.S. Appl. No. 11/600,635.
Non-Final Office Action dated Aug. 20, 2008 for U.S. Appl. No. 11/600,635.
Response filed Nov. 20, 2008 to Non-Final Office Action dated Aug. 20, 2008 for U.S. Appl. No. 11/600,635.
Final Office Action dated Feb. 3, 2009 for U.S. Appl. No. 11/600,635.
Response filed Apr. 10, 2009 to Final Office Action dated Feb. 3, 2009 for U.S. Appl. No. 11/600,635.
Advisory Action dated Apr. 17, 2009 for U.S. Appl. No. 11/600,635.
Notice of Abandonment date mailed Sep. 1, 2009 for U.S. Appl. No. 11/600,635.
Non-Final Office Action dated Mar. 21, 2006 for U.S. Appl. No. 10/760,802.
Response filed Apr. 18, 2006 to Non-Final Office Action dated Mar. 21, 2006 for U.S. Appl. No. 10/760,802.
Non-Final Office Action dated May 16, 2006 for U.S. Appl. No. 10/760,802.
Notice of Abandonment dated Apr. 5, 2007 for U.S. Appl. No. 10/760,802.
Non-Final Office Action dated Jun. 28, 2005 for U.S. Appl. No. 10/893,757.
Response filed Nov. 28, 2005 to Non-Final Office Action dated Jun. 28, 2005 for U.S. Appl. No. 10/893,757.
Non-Final Office Action dated Feb. 9, 2006 for U.S. Appl. No. 10/893,757.
Notice of Abandonment dated Sep. 7, 2006 for U.S. Appl. No. 10/893,757.
Restriction Requirement dated Dec. 19, 2008 for U.S. Appl. No. 10/866,533.
Response filed Dec. 31, 2008 to Restriction Requirement dated Dec. 19, 2008 for U.S. Appl. No. 10/866,533.
Restriction Requirement dated Feb. 26, 2009 for U.S. Appl. No. 10/866,533.
Response filed Mar. 25, 2009 to Restriction Requirement dated Feb. 26, 2009 for U.S. Appl. No. 10/866,533.
Non-Final Office Action date mailed Jun. 9, 2009 for U.S. Appl. No. 10/866,533.
Interview Summary date mailed Aug. 14, 2009 for U.S. Appl. No. 10/866,533.
Non-Final Office Action dated Feb. 5, 2007 for U.S. Appl. No. 10/866,517.
Response filed Jun. 5, 2007 to Non-Final Office Action dated Feb. 5, 2007 for U.S. Appl. No. 10/866,517.
Final Office Action date mailed Aug. 1, 2007 for U.S. Appl. No. 10/866,517.
RCE/Response filed Oct. 31, 2007 to Final Office Action date mailed Aug. 1, 2007 for U.S. Appl. No. 10/866,517.
Interview Summary dated Jan. 9, 2008 for U.S. Appl. No. 10/866,517.
Non-Final Office Action dated Jan. 9, 2008 for U.S. Appl. No. 10/866,517.
Response filed May 9, 2008 to Non-Final Office Action dated Jan. 9, 2008 for U.S. Appl. No. 10/866,517.
Final Office Action dated Aug. 27, 2008 for U.S. Appl. No. 10/866,517.
RCE/Response filed Nov. 24, 2008 to Final Office Action dated Aug. 27, 2008 for U.S. Appl. No. 10/866,517.
Interview Summary dated Nov. 26, 2008 for U.S. Appl. No. 10/866,517.
Non-Final Office Action dated Feb. 20, 2009 for U.S. Appl. No. 10/866,517.
Interview Summary dated Mar. 12, 2009 for U.S. Appl. No. 10/866,517.
Interview Summary dated Mar. 19, 2009 for U.S. Appl. No. 10/866,517.
Response filed Apr. 10, 2009 to Non-Final Office Action dated Feb. 20, 2009 for U.S. Appl. No. 10/866,517.
Supplemental Amendment Response filed Apr. 21, 2009 to Non-final Office Action date mailed Feb. 20, 2009 and Examiner Interviews on Mar. 10, 2009; Mar. 17, 2009; Apr. 17, 2009 and Apr. 20, 2009 for U.S. Appl. No. 10/866,517.
Notice of Allowance date mailed May 14, 2009 for U.S. Appl. No. 10/866,517.
Notice of Allowance date mailed Jun. 19, 2009 for U.S. Appl. No. 10/866,517.
RCE filed Jun. 26, 2009 for U.S. Appl. No. 10/866,517.
Notice of Allowance date mailed Jul. 10, 2009 for U.S. Appl. No. 10/866,517.
Non-Final Office Action date mailed Mar. 12, 2010 for U.S. Appl. No. 11/600,498.
Notice of Allowance and Examiner Interview Summary date mailed Apr. 5, 2010 for U.S. Appl. No. 11/600,498.
Non-Final Office Action date mailed Sep. 1, 2010 for U.S. Appl. No. 12/776,147.
Non-Final Office Action date mailed Apr. 6, 2010 for U.S. Appl. No. 10/866,533.
Response filed Apr. 29, 2010 for U.S. Appl. No. 10/866,533.
Final Office Action date mailed Jul. 28, 2010 for U.S. Appl. No. 10/866,533.
Response filed Sep. 15, 2010 for U.S. Appl. No. 12/776,147.

Notice of Allowance date mailed Nov. 18, 2010 for U.S. Appl. No. 12/776,147.
Response filed Sep. 28, 2010 for U.S. Appl. No. 10/866,533.
Advisory Action date mailed Oct. 13, 2010 for U.S. Appl. No. 10/866,533.
RCE/Response filed Oct. 28, 2010 for U.S. Appl. No. 10/866,533.
European Search Report date mailed Nov. 23, 2009; European Application No. 02803159.9.
"What is adPOS?" and "adPOS for Retailers", adPOS; retrieved from the Internet on May 22, 2002 at URL: <http://www.adpos.net/whatisadpos.html> and URL: <http://www.adpos.net/forretailers.html> (original Internet Publication Date Unknown).
Non-Final Rejection date mailed Sep. 28, 2009 in U.S. Appl. No. 11/600,498.
Response filed Nov. 23, 2009 to Non-Final Rejection dated Sep. 28, 2009 in U.S. Appl. No. 11/600,498.
Final Rejection date mailed Dec. 23, 2009 in U.S. Appl. No. 10/866,533.
Response filed Jan. 15, 2010 to Final Rejection dated Dec. 23, 2009 in U.S. Appl. No. 10/866,533.
Examiner Interview Summary date mailed Jan. 19, 2010 in U.S. Appl. No. 10/866,533.
Advisory Action date mailed Feb. 12, 2010 in U.S. Appl. No. 10/866,533.
RCE filed Feb. 26, 2010 U.S. Appl. No. 10/866,533.

* cited by examiner

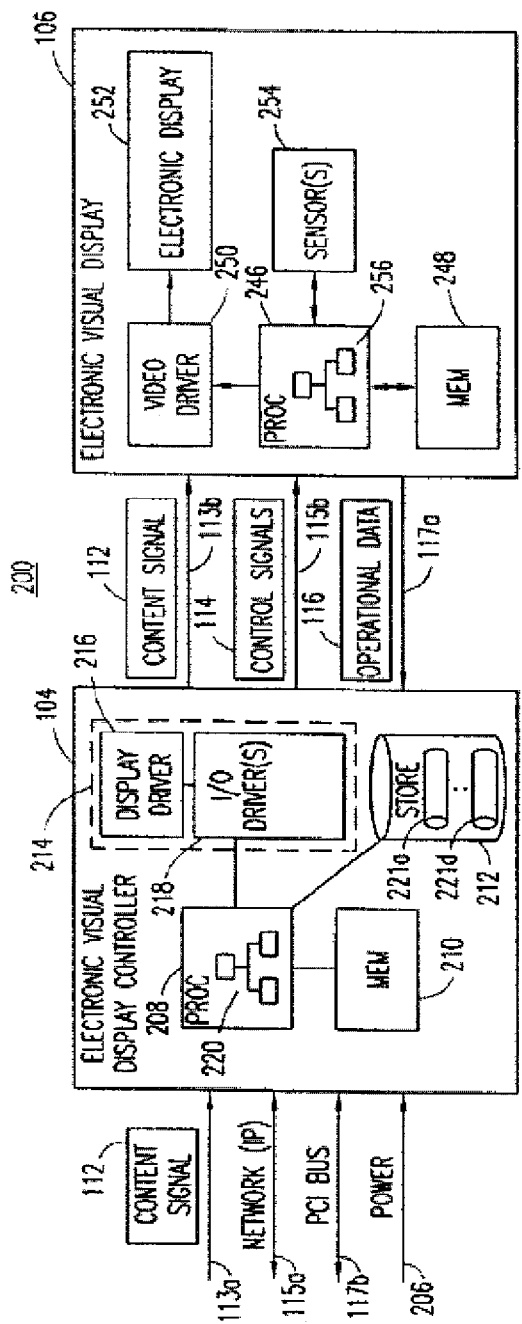
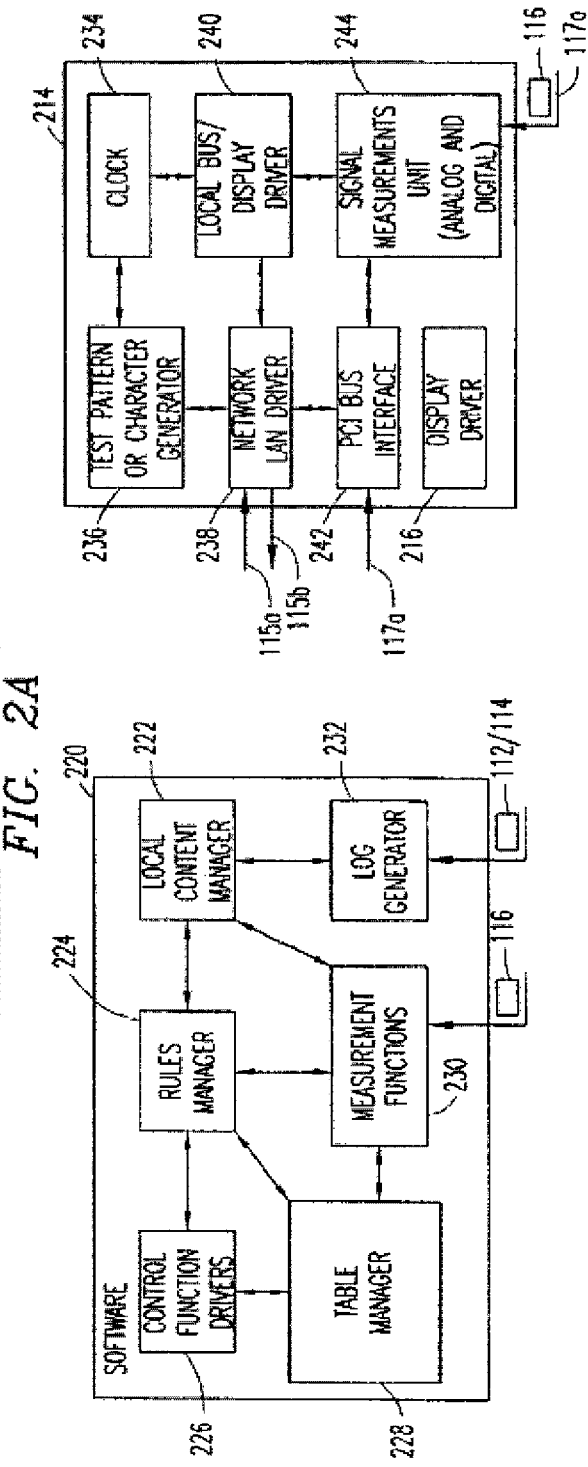
FIG. 2A
FIG. 2B
FIG. 2C

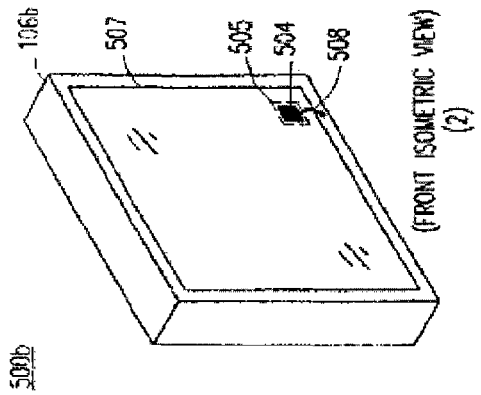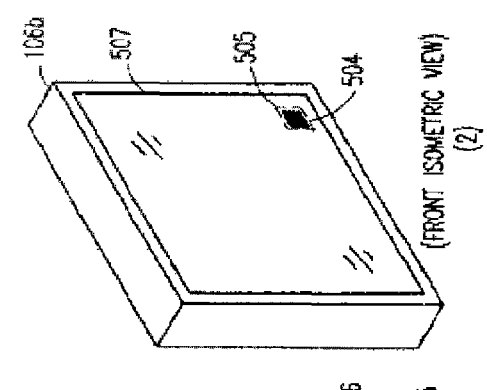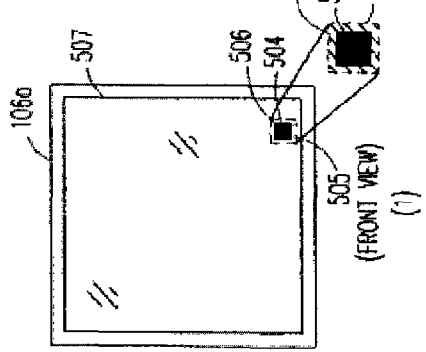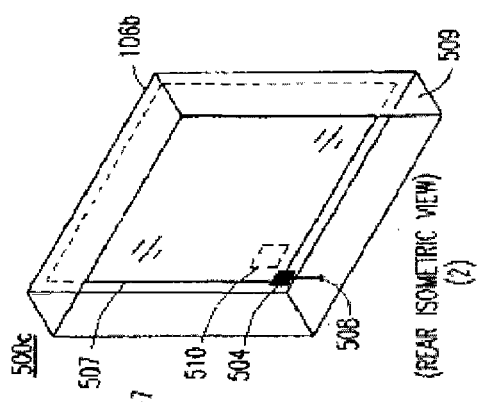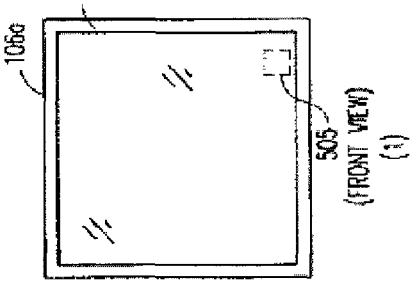
FIG. 5A
FIG. 5B
FIG. 5C

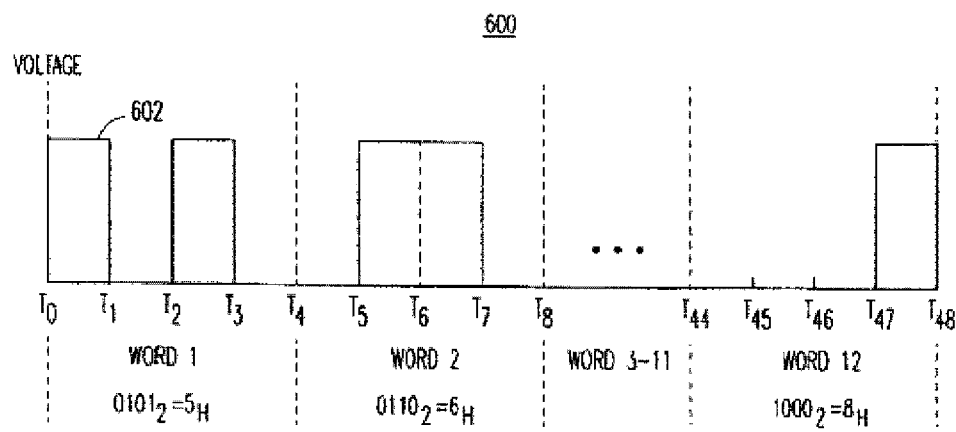
FIG. 6
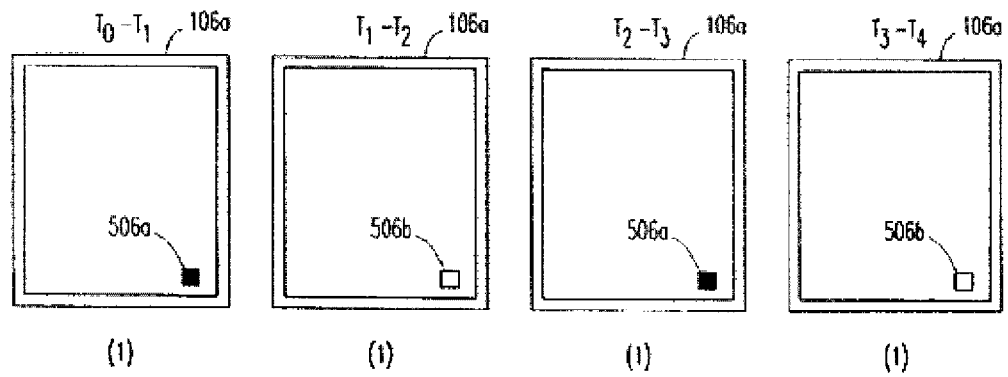
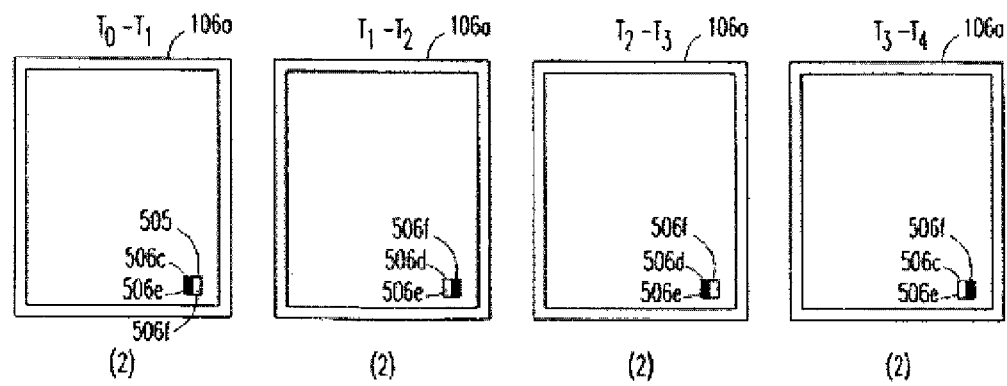
FIG. 7A    FIG. 7B    FIG. 7C    FIG. 7D

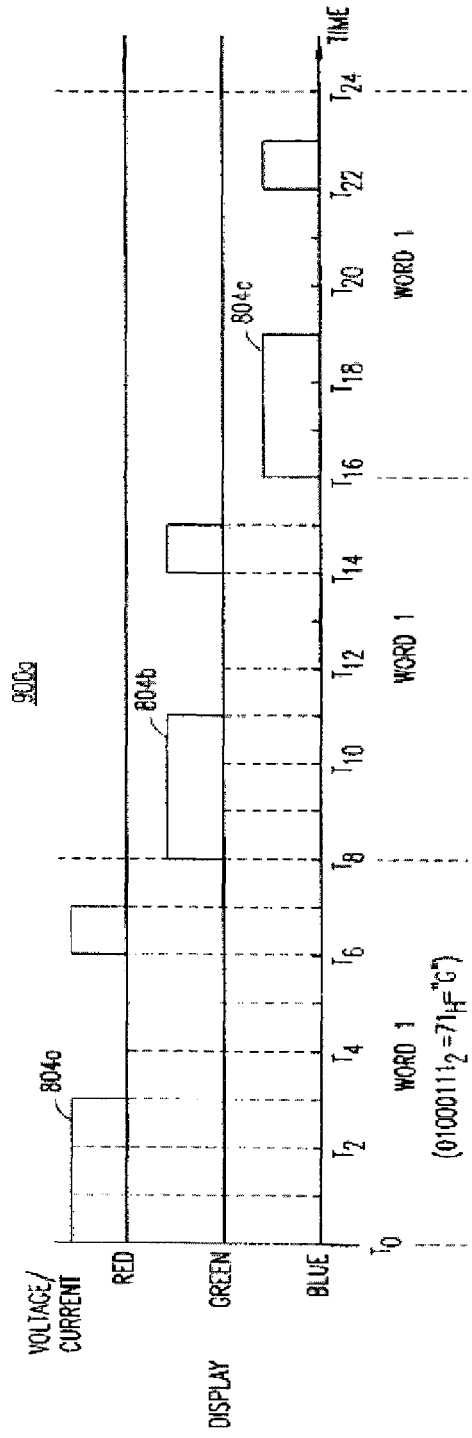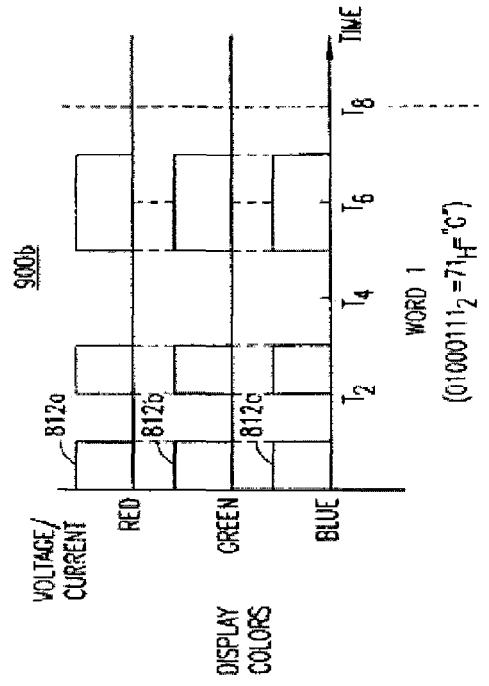

SYSTEM AND METHOD FOR VERIFYING CONTENT DISPLAYED ON AN ELECTRONIC VISUAL DISPLAY BY MEASURING AN OPERATIONAL PARAMETER OF THE ELECTRONIC VISUAL DISPLAY WHILE DISPLAYING THE CONTENT

CROSS-REFERENCES TO RELATED APPLICATIONS

This Application is a Divisional of U.S. patent application Ser. No. 10/265,512 filed on Oct. 3, 2002 now U.S. Pat. No. 7,614,065, which claims the benefit of and priority from and hereby incorporates by reference the entire disclosure of U.S. Provisional Application for Patent Ser. No. 60/341,626, filed Dec. 17, 2001, which is now expired.

BACKGROUND OF THE INVENTION

1. Technical Field of the Invention

The principles of the present invention generally relate to verification of visual content displayed on an electronic visual display, and, more particularly, to measuring (1) an operational parameter of the electronic visual display and/or (2) a verification code associated with the visual content for verification of the visual content being displayed.

2. Description of Related Art

Advertisers of products and services are acutely concerned that the advertisements placed in various media are properly represented. In the case of advertisements being placed in printed periodicals, such as newspapers or magazines, "tear sheets" as understood in the art are utilized to (1) determine that the advertisement was in fact "run" or printed in the periodical, and (2) determine that the advertisement was properly printed. In terms of being properly printed, factors such as color and registration (i.e., alignment of the colors that form the image) are important to the advertisers as the quality of the advertisements may affect sales opportunities. Additionally, printed advertisements are expensive and, if the quality of the advertisement is incorrect, then the advertiser expects and receives a discount for improper services rendered by the producers of the periodical. In fact, there are companies that specialize in tearing out the advertisements from the periodicals and provide the tear sheets to the advertisers for verification that an advertisement in the periodical was timely run, properly placed, and had acceptable quality.

Since electronic visual technology has evolved dramatically since the advent of the television, advertisers have utilized the technology to reach target audiences. The advertisers, and other information and content providers, have had to trust that the electronic communication and display equipment has been operational from the content distribution point to the electronic visual displays that are remotely located. To address these concerns, electronic visual displays have become standardized such that the colors produced by one display is substantially consistent with each other display. However, the electronic visual displays, as with all electronic devices, deteriorate, fail, or become uncalibrated over time. Types of electronic visual displays may include cathode ray tube (CRT), liquid crystal display (LCD), plasma, light emitting diode (LED), organic LED, and projection screens. As understood in the art these displays are of the flat and non-flat panel display types and are based on either emitted or reflected light to create images.

Content providers, including advertisers and information sources and operators of the electronic visual display equipment are interested in knowing that the equipment is working properly to be assured that the content is being properly delivered to and displayed by the electronic visual display. However, to monitor each electronic visual display by having a person constantly checking the operations thereof is not financially attractive to the operator. For example, airport operators charged with displaying airline schedules on remotely located electronic visual displays need to know that the displays are properly working. However, to have an individual continuously monitoring the operation of each electronic visual display by walking to and viewing each may not be feasible or economically advantageous for even for modestly sized airports. Similarly, operators of electronic billboards, which is one form of an electronic visual display, need to know (1) that the electronic billboards are properly working and (2) that the content is being received and properly displayed by the electronic billboards.

In providing an operator of remotely located electronic visual displays the ability to determine that the displays are operating properly, product developers and/or after-market providers of the electronic visual displays have developed various feedback mechanisms for operational parameters. Depending upon the type of electronic visual display, the operational parameters being sensed and fed-back may vary. However, conventional feedback mechanisms almost completely rely on sensing voltage and current operational parameters of the electronic visual display.

In early efforts for providing feedback of operational parameters, a simple indication that the electronic visual display was drawing power was monitored. However, more recently, additional operational and functional parameters have been monitored to improve knowledge of the specific operations of the remotely located display. Such operational and functional parameter monitoring may include temperature, voltage, current, light (as a function of current being drawn by a light source), frame rate, and refresh rate. It should be understood, however, that these operational parameters may not be reasonably available for certain electronic visual displays. In general, the operational parameters being fed-back by conventional electronic visual displays are utilized to merely provide an indication of the operation of the electronic visual display for maintenance or remote adjustment purposes.

Still yet, the use of signature analysis has been utilized for testing and remote adjustment purposes. Signature analysis is a technique whereby a known test signal (e.g., a particular display color, intensity, or image pattern) is applied to an electronic visual display to cause a known or expected response of one or more operational parameters by the display. By measuring one or more operational parameters resulting from a known test signal, it can be determined whether the electronic visual display is operating properly and remotely adjusted.

To further provide feedback as to the operation of an electronic visual display, one technique has included stationing a remote camera facing the display. Photographs or video images may be taken of the output of the electronic visual display and fed-back via a network to provide the operator of the remotely located electronic visual display with the images to manually determine whether the electronic visual display is operating properly. For example, this remote camera technique allows for the operator to determine that the picture tube, elements of an LED display, etc., are operating properly for a billboard located on a building or highway that is remotely located from an operation control center. However, similar to the previously described operational parameter feedback techniques, the purpose for performing the feedback is for remotely monitoring and/or controlling operation of the electronic visual display for maintenance purposes. The remote camera technique requires the communication of images that may be large so as to be bandwidth and memory intensive. Also, as the number of displays being monitored becomes large, evaluation and management of the images being fed-back becomes impractical and expensive.

SUMMARY OF THE INVENTION

To improve the informational feedback for operators of remotely located electronic visual displays, multiple levels of verification techniques for verifying timely and proper display of visual content have been developed. The levels of verification may include monitoring and assessing certain communication and operational parameters to provide the operator and content provider with confidence that the communication equipment and electronic visual displays are operating correctly. Further, depending upon the particular level of verification being utilized, a visual verification code associated with visual content may be displayed and measured in association with the visual content being displayed on the electronic visual display, thereby providing the content provider with verification that the associated visual content was timely and properly displayed. A log containing the results of the measurement may be generated to provide notification to an operator of a success or failure of the content being timely and properly displayed based on the verification.

Multiple levels of verification of the visual content being displayed include a system and method, where the method includes communicating the visual content via a visual content signal to an electronic visual display for displaying between a start time and an end time. A first indicator indicative of the occurrence of the communication of the visual content signal to the electronic visual display is recorded. The visual content signal is displayed between the start and end times. An operational parameter of the electronic visual display between the start and end times is sensed and a second indicator indicative of the sensed operational parameter is recorded. The first and second indicators provide for verification of the visual content being displayed by the electronic visual display. Signature analysis may be performed using the second indicator to determine that the visual content signal was properly displayed.

Other levels of verification of the visual content being displayed include a system and method, where the system includes a first electronic circuit operable to apply (i) a visual verification code signal indicative of a verification code associated with visual content and (ii) the visual content on the electronic visual display. An optical sensor may be disposed in relation to the electronic visual display and display region of the visual verification code signal, where the optical sensor is operable to sense illumination of the visual verification code signal. A second electronic circuit is operable to receive a sensed visual verification code signal from the optical sensor and to communicate data associated with the sensed visual verification code signal. A third electronic circuit operable to receive the data associated with the sensed visual verification code signal further may be operable to determine that the data is indicative of the verification code so as to identify that the associated visual content is displayed. By displaying the visual verification code signal using various colors and light intensities, the colors and brightness may be verified, thereby indicating that the electronic visual display is operating and adjusted properly and that the visual content is properly displayed.

BRIEF DESCRIPTION OF THE DRAWINGS

A more complete understanding of the method and apparatus of the principles of the present invention may be obtained by reference to the following Detailed Description when taken in conjunction with the accompanying Drawings wherein:

FIGS. 2A-2C (hereinafter FIG. 2) is a more detailed block diagrams of an electronic visual display controller and electronic visual display of FIG. 1;

FIGS. 5A-5C (collectively FIG. 5) provide a number of exemplary embodiments for utilizing an optical sensor for measuring illumination of a verification code on the electronic visual display of FIG. 1;

FIG. 6 is an exemplary graph for showing a digital verification code signal representative of a content identifier or verification code associated with a visual content signal of FIGS. 1 and 2;

FIGS. 7A(1)-7D(1) AND 7A(2)-7D(2) (collectively FIG. 7) are a sequence of images that illustrate the visual verification code signal being displayed as a combination of values on the electronic visual display of FIGS. 1 and 2;

FIGS. 9A and 9B are exemplary timing diagrams for measuring the visual verification code signal 506 of FIGS. 6-7B serially and in parallel, respectively;

DETAILED DESCRIPTION OF THE DRAWINGS

The principles of the present invention provide an operator of a remotely located electronic visual display with the ability to verify that particular visual content is both timely and properly displayed on the electronic visual display. By being able to verify that the visual content is timely and properly displayed, the operator and customers of the operator are able to confidently know that the visual content was indeed displayed at a particular time and that the electronic visual display was operating properly such that viewers of the content were able to view the content as intended. The ability to verify the display of the visual content may produce an "electronic tear-sheet".

To provide for the verification of the content being displayed, four basic levels of verification are provided by the principles of the present invention. These levels include:
(1) a combination of (a) confirmation of content delivery to an electronic visual display and (b) operational parameter feedback;
(2) a combination of (a) verification level 1 and (b) expected operational parameter feedback analysis (i.e., signature analysis);
(3) displayed and read verification code feedback; and
(4) level 3 verification plus signature analysis.

Each of these verification levels provide the operator of the remotely located electronic visual display with higher levels of confidence that the content was timely and properly displayed. However, as the levels of verification increase, so do the levels of technology and, possibly, cost to implement. Additionally, by feeding back the operational parameters, including those produced by measuring the verification code, predictions as to time of failure may be performed, thereby providing for preemptive maintenance to reduce electronic visual display downtime. It should be understood that other levels may be provided by combining or generating fewer or additional operational parameters and/or other relevant information associated with displaying visual content and/or display parameters on a remotely located electronic visual display. Each of the four verification levels are described more fully herein.

Figure 1:
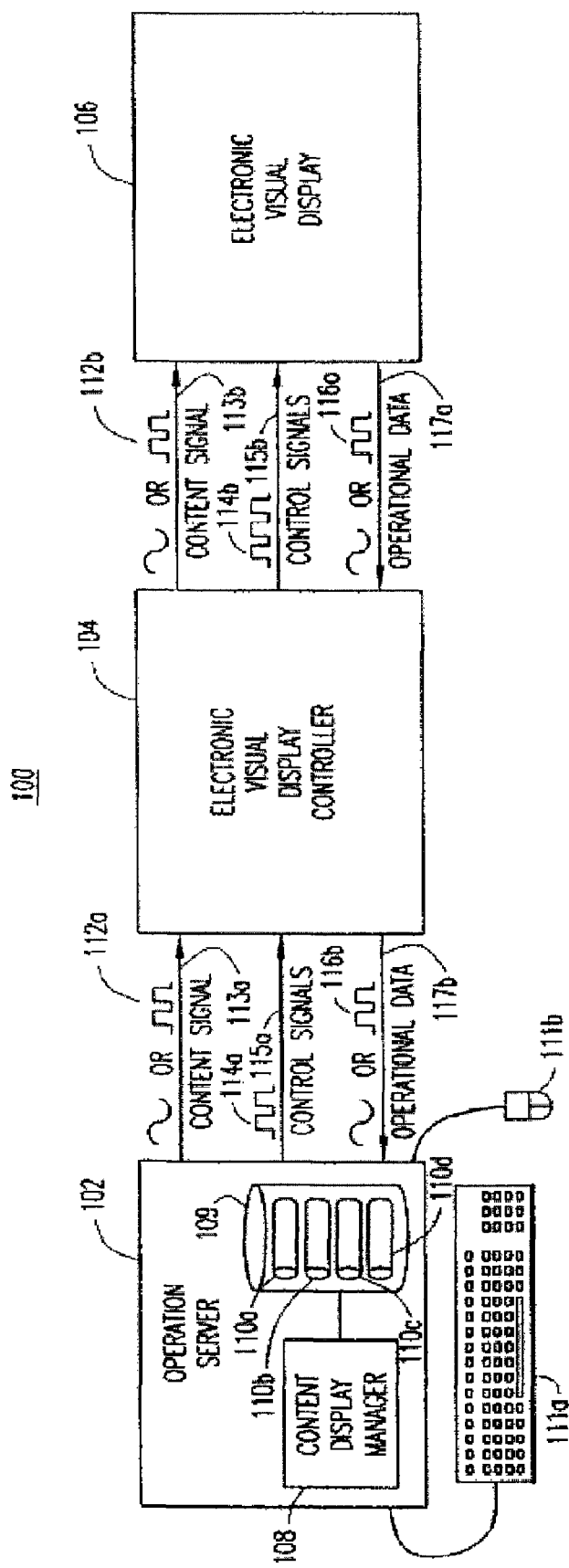
FIG. 1 is an exemplary block diagram of a system for displaying and verifying that visual content is displayed on an electronic visual display.

FIG. 1 is an exemplary block diagram of a system 100 for displaying and verifying that visual content and/or display parameters are displayed on an electronic visual display. As shown, the system 100 includes an operation server 102, electronic visual display controller 104, and electronic visual display 106. Accordingly, more or fewer components may be utilized to provide for the display and verification. In one embodiment, the electronic visual display controller 104 and the electronic visual display 106 may be combined as a single unit.

The operation server 102 includes a content display manager 108 that is operable to manage the content for display by the electronic visual display 106. As understood in the art, the content server 102 may interface and operate many electronic visual display controllers 104 located on a network. The managing may include a storage unit 109 operable to store (i) a content database 110a having the visual content stored therein, (ii) a management database 110b that maintains information utilized to distribute the visual content to the electronic visual display 106 at specific times and dates, for example, (iii) a log database 110c operable to maintain information associated with the display of the visual content being feedback from the electronic visual display 106, and (iv) an expected operational parameter database 110d for signature analysis usage. In managing the visual content, an operator of the operation server 102 may utilize input and control devices 111a and 111b coupled to the operation server 102. The input and control devices 111a and 111b may include a keyboard and computer mouse. Alternatively, other input and control devices 111a and 111b, such as a stylus, operable to interact with the content display manager 108 may be utilized to generate and/or schedule the visual content for distribution and display.

The electronic visual display controller 104 is operable to receive information from the operation server 102 and drive the electronic visual display 106. Additionally, the electronic visual display controller 104 may be utilized to interact with and/or control the electronic visual display 106 based on information of operational parameter(s) being fed-back by the electronic visual display 106. Additional detail for an exemplary embodiment of the electronic visual display controller 104 and electronic visual display 106 is shown further in accordance with FIG. 2. In another embodiment (not shown), portions of the functions of the operation server 102 may be included into the visual display controller 104 to enable the electronic visual display 106 to operate in a substantially standalone manner (i.e., where no local server exists and without having to operate in a local network).

In operation, the operation server 102 communicates a visual content signal 112a via line 113a to the electronic visual display controller 104, which, in turn, communicates a visual content signal 112b via line 113b to the electronic visual display 106. The visual content signals 112a and 112b (Hereinafter 112) may be identical or the visual content signal 112b may be a derivative of the visual content signal 112a. The visual content signal 112 may be analog or digital. If the visual content signal 112 is analog, then the electronic visual display controller 104 may convert the visual content signal 112 into a digital signal for communication to the electronic visual display 106. Alternatively, the electronic visual display controller 104 may directly or indirectly communicate the visual content signal 112 as an analog signal for direct display or for analog-to-digital (A/D) conversion and display by the electronic visual display 106. Additionally, the operation server 102 communicates control signals 114a via line 115a to the electronic visual display controller 104, which, in turn, may communicate the control signals 114b (hereinafter control signals 114) via line 115b to the electronic visual display 106. The same or derivative control signals 114a received by the electronic visual display controller 104 may be communicated to the electronic visual display 106.

The control signals 114 may be utilized to initiate display of the visual content signal 112, alter operational parameters of the electronic visual display 106, or perform some other control function of the electronic visual display controller 104 or electronic visual display 106. The control signals 114 are typically digital signals, however, analog control signals alternatively may be utilized to control the electronic visual display 106. A standard bus architecture and protocol may be utilized for communicating the control signals 114. Alternatively, a non-standard bus architecture and protocol may be utilized. If the visual content signal 112 is digital, then the visual content signal 112 and control signals 114 may be communicated over a single bus as understood in the art. The electronic visual display controller 104 processes or conveys the visual content signal 112 and control signals 114 for delivery to the electronic visual display 106.

The electronic visual display 106, which may be of any display type, including CRT, LCD, LED, organic LED, plasma, or any other electronic visual display device, may receive the control signals 114 and provide for operational data 116a to be fed-back from the electronic visual display 106 to the electronic visual display controller 104 via line 117a and may be analog or digital. The operational data 116 may include any operational information of the electronic visual display 106 that can be measured as understood in the art. Such operational data 116 may include temperature, voltage, current, frame rate, refresh rate, etc., according to the type of electronic visual display 106 being utilized and sensors operating within the electronic visual display 106. It should be understood that a variety of voltage and currents may be measured at the electronic visual display 106. For example, a voltage level from the power supply that sources the electronic visual display 106 may be measured. Alternatively, voltage or current levels being drawn by various components, such as a fluorescent light bulb of a liquid crystal display device or LED of an LED display device, may be measured.

The electronic visual display controller 104 further may process and/or communicate the operational data 116a back to the operation server 102 as operational data 116b (hereinafter operational data 116). The operation server 102 may apply the operational data 116 of the electronic visual display 106 to the log database 110c stored by the storage unit 109. Additionally, data other than the operational data 116 of the electronic visual display 106 may be provided to the operation server 102. For example, information regarding the communication of the visual content signal 112 from the electronic visual display controller 104 to the electronic visual display 106 may be applied to the log database 110c. The communication information may include the existence of date and/or time of the communication of the visual content signal 112.

By feeding-back the operational data 116 and data associated with the communication of the visual content signal 112 to the operation server 102, verification levels 1 and 2 may be achieved. In other words, by recording when the visual content is communicated to the electronic visual display 106 and recording the operational parameter(s) of the electronic visual display 106 at the time of the display of that visual content, a verification level 1 may be performed either automatically or manually by determining that (a) the visual content was delivered and (b) the electronic display device was operating properly during the display of the visual content. If the operational data 116 has associated expected operational parameter data stored in the expected operational parameter database 110d, then verification level 2 may be achieved by comparing the operational parameter data fed-back with the expected operational parameter data.

FIGS. 2A, 2B, and 2C (FIG. 2) are more detailed block diagrams of the electronic visual display controller 104 and electronic visual display 106 of FIG. 1. FIG. 2A illustrates the electronic visual display controller 104 coupled to a databus 113a, which may be analog or digital, and is operable to carry the visual content signal 112. A network IP bus 115a, PCI bus 117b, and power bus 206 are further coupled to the electronic visual display controller 104 and utilized to communicate general network, control information (e.g., control signals 114), and power, respectively, to the electronic visual display controller 104 from the operation server 102 (FIG. 1).

It should be understood that the content signal 112 may be communicated across the PCI bus 117b rather than the databus 113a. It should further be understood that the content signal 112 and control signals 114 are not dependent on the protocol or architecture of the associated buses. For example, rather than utilizing multiple buses 113a, 115a, and 117b, a single bus may be used to provide for communication. The electronic visual display controller 104 may include a processor 208 coupled to a memory 210, and further be coupled to a store 212 and a driver unit 214. The driver unit 214 may include a display driver 216 and driver module 218.

As shown in FIG. 2B, the processor 208 is operable to execute software 220, which may include a local content manager 222 that manages the visual content and other content information received by the electronic visual display controller 104. Rules manager 224 is operable to apply rules for making decisions as to management of the visual content, applying the verification code, monitoring operational parameters, and performing other functional operations in accordance with the principles of the present invention.

Control function drivers 226 may be software that operate hardware for controlling the electronic visual display 106. The control function drivers 226 may include multiple drivers for providing interfacing capability with a variety of types and brands of electronic visual displays 106 produced by different manufactures of electronic visual displays 106. For example, a plasma-type electronic visual display 106 utilizes different control function drivers 226 than does an LCD-type electronic visual display 106. And, different manufacturers of the same type of electronic visual display 106 may utilize different control protocols or commands and therefore require different control function drivers 226.

The control function drivers 226 may include various levels of control capability for the electronic visual display 106. For example, a low cost electronic visual display controller 104 may not include various automatic adjustment type drivers, such as intensity or volume, while a more expensive electronic visual display controller 104 may include intensity and volume control function drivers 226. Additionally, depending upon the verification level being utilized, other control function drivers 226 may be included. For example, while a verification level 1 system may simply measure the existence of a particular operational parameter communicated via the operational data 116, a verification level 2 system may utilize a control function driver 226 that alters the operational parameters being fed-back by the electronic visual display 106 by comparing the operational data 116 with certain expected operational parameters of the electronic visual display 106 as a result of displaying a particular visual content signal 112 or test signal.

A limit table manager 228 may be utilized to determine that certain responses of the operational parameters result from displaying a visual content signal 112 on the electronic visual display 106, thereby providing for verification levels 2 and 4. For example, the limit table manager 228 may interact with the expected operational parameter database 110d stored in the storage unit 109 of the operation server 102 or a corresponding expected operational parameter database 221d stored in the store 212 of the electronic visual display controller 104 for performing signature analysis based on expected operational parameter feedback. Test or signature patterns may be stored and inserted into the visual content signal 112 to perform signature analysis.

Further included in the software 220 of the electronic visual display controller 104 are measurement functions 230 as understood in the art. The measurement functions 230 operate to receive the operational data 116 and determine values associated therewith. For example, operational data 116 representative of voltage levels (e.g., power supply or individual components) used by the electronic visual display 106 may be sensed by sensors in the electronic visual display 106 and measured by the measurement functions 230. Alternatively, the measurement function may be performed by the electronic visual display 106. The measurement functions 230 may also interact with the limit table manager 228 in performing the signature analysis by comparing expected operational parameters with the actual measured operational parameters as provided by the operational data 116.

A log generator 232 may be utilized to form a log event in the log database 221b each time the electronic visual display controller 104 communicates the visual content signal 112 to the electronic visual display 106 and/or each time the visual content signal 112 is displayed on the electronic visual display 106. The log generator 232 may receive information via the PCI bus 117a or as part of the visual content signal 112 or control signals 114 that includes identification data associated with the visual content signal 112. By having the log generator 232 form a log event verification levels 1 and 2 of the visual content signal 112 being displayed is enabled. However, it should be understood that the log generator 232 may be located in the operation server 102, whereby when the operation server 102 communicates the visual content signal 112 to the electronic visual display controller 104, a log of the communication may be stored in the log database 110c.

As shown in FIG. 2C, the driver unit 214 may include a number of components including a clock 234, test pattern or character generator 236, network local area network (LAN) driver 238, local bus/display driver 240, PCI bus interface 242, signal measurements unit 244, and display driver 216. It should be understood, however, that the functions of the driver unit 214 may additionally and/or alternatively be executed by the processor 208. The clock 234 may be utilized to maintain proper synchronization between the electronic visual display controller 104 and the electronic visual display 106. The test pattern or character generator 236 may be utilized to generate a test pattern to allow the electronic visual display controller 104 to measure operational parameter(s) having an expected operational parameter feedback, thereby providing for test and calibration capabilities.

The network LAN driver 238 may be utilized in performing communications between the electronic visual display controller 104 and the electronic visual display 106. The network LAN driver 238 may also be utilized in communicating with other remotely located devices as understood in the art. The local bus/display driver 240 may additionally provide local communication with the electronic visual display 106 or other remotely located devices. The PCI bus interface 242 may be utilized to interface with the processor 208 and the operation server 102 via the PCI bus 117a as understood in the art.

A signal measurements unit 244 may be capable of interfacing with analog and/or digital signals from the electronic visual display 106. Accordingly, the signal measurements unit 244 may include A/D converters (not shown) for sampling analog signals, if the signals received from the electronic visual display 106 are analog. The signal measurements unit 244 may also include a processor (not shown) or other electronic device operable to perform measurements of the operational data 116. It should be understood that the measurement functions 230 and the signal measurements unit 244 may be combined or operated in conjunction with one another such that the operational data 116 is measured or received in accordance with the types of operational parameters being fed-back by the electronic visual display 106 via PCI bus 117a.

The electronic visual display 106 includes a processor 246 coupled to memory 248 and video driver 250, which is coupled to and operable to drive an electronic display 252. It should be understood that, depending on the type of electronic visual display 106, other hardware components may be included or excluded from the electronic visual display 106 as understood in the art. For example, a CRT-type electronic visual display 106 would include a picture tube for displaying the visual content signal 112 and an LCD-type electronic visual display 106 would include LCD drivers and, typically, a florescent light source.

The processor 246 further may be coupled to conventional sensor(s) 254 that may be utilized to measure operational parameters of the electronic visual display 106. For example, the sensors 254 may sense voltage, current, scan rate, etc. The information sensed by the sensor(s) 254 may be received directly by the processor 246 or, in the case of measuring analog signals, be sampled by D/A converters (not shown) located in the electronic visual display 106 or electronic visual display controller 104. The processor executes software 256 that is used to interface with the video driver 250 in order to display the visual content signal 112 by the electronic display 252. The software 256 may also be utilized to form log data in the memory 248 for communication to the electronic visual display controller 104.

Other functionality may be performed by the software 256. For example, the software 256 may be utilized to interface with a wireless communication device or interface to receive the visual content signal 112 and control signals 114 and communicate the operational data 116 back to the electronic visual display controller 104. It should be understood that the electronic visual display 106 may alternatively be a slave device and be fully operated and controlled by the electronic visual display controller 104.

Figure 3A:
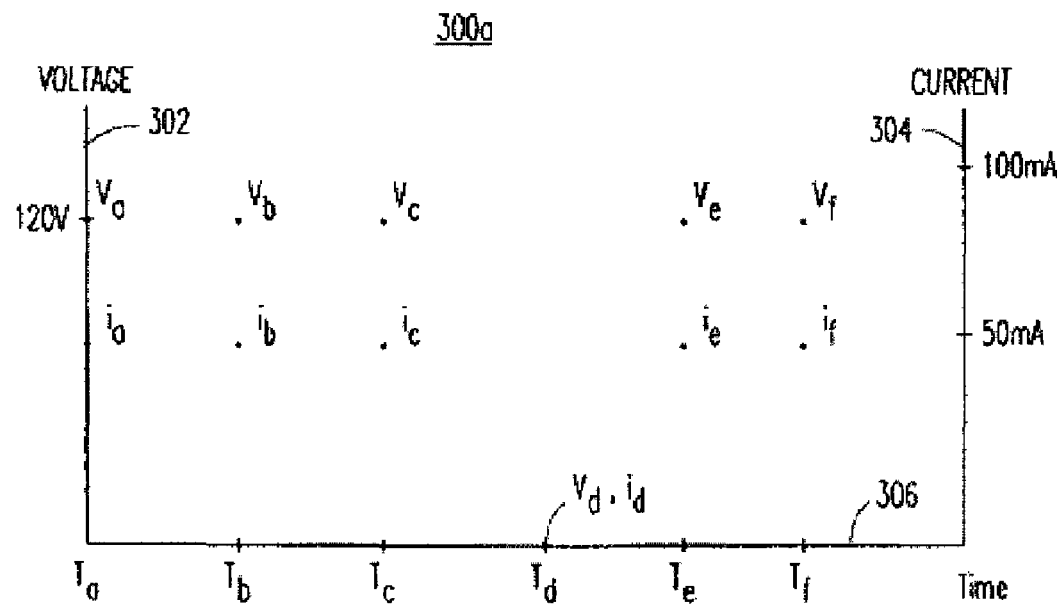
FIG. 3A is an exemplary graph illustrating measured operational parameters of the electronic visual display of FIGS. 1 and 2.

FIG. 3A is an exemplary graph illustrating a pair of measured operational parameters of the electronic visual display 106. As shown, a voltage axis 302 and the current axis 304 are used to show both voltage (v) and current (i) operational parameters, respectively, of the electronic visual display 106. The voltage operational parameter displayed is the overall voltage supplying the electronic visual display 104. However, other voltages may be measured for feedback purposes. As shown, the voltage operational parameter is sampled at discrete points in time, $T_a$-$T_f$, producing samples $v_a$-$v_f$. By sampling the operational parameter(s), an indication of the operation of the electronic visual display 106 is provided at those points in time.

As shown, the voltage operational parameter measured at time points $T_a$-$T_c$ and $T_e$-$T_f$ is measured at approximately 120 volts. However, at time $T_d$, the voltage $v_d$ is indicated as being 0 volts, which may be due to a power interruption of the electronic visual display 106 or by a source power supply. Similarly, the current operational parameter $i_a$-$i_f$ is sensed at time points $T_a$-$T_f$. The current operational parameter may be the current drawn by the electronic visual display 106 or current being drawn for a particular component, such as current drawn by one or more LEDs, of the electronic visual display 106. As shown, the current operational parameters $i_a$-$i_c$ and $i_e$-$i_f$ are measured at 50 milliamps (mA). However, at time $T_d$, the current operational parameter $i_d$ is measured at 0 amps, which indicates that the electronic visual display 106 is not receiving voltage or that the particular electrical element with which the current operational parameter is associated has failed at time $T_d$. By combining the log from the visual content signal 112 being delivered to or displayed by the electronic visual display 106 with the measurements of the operational parameters, verification level 1 indicating that the visual content was likely to have been timely and properly displayed may be achieved.

Figure 2D:
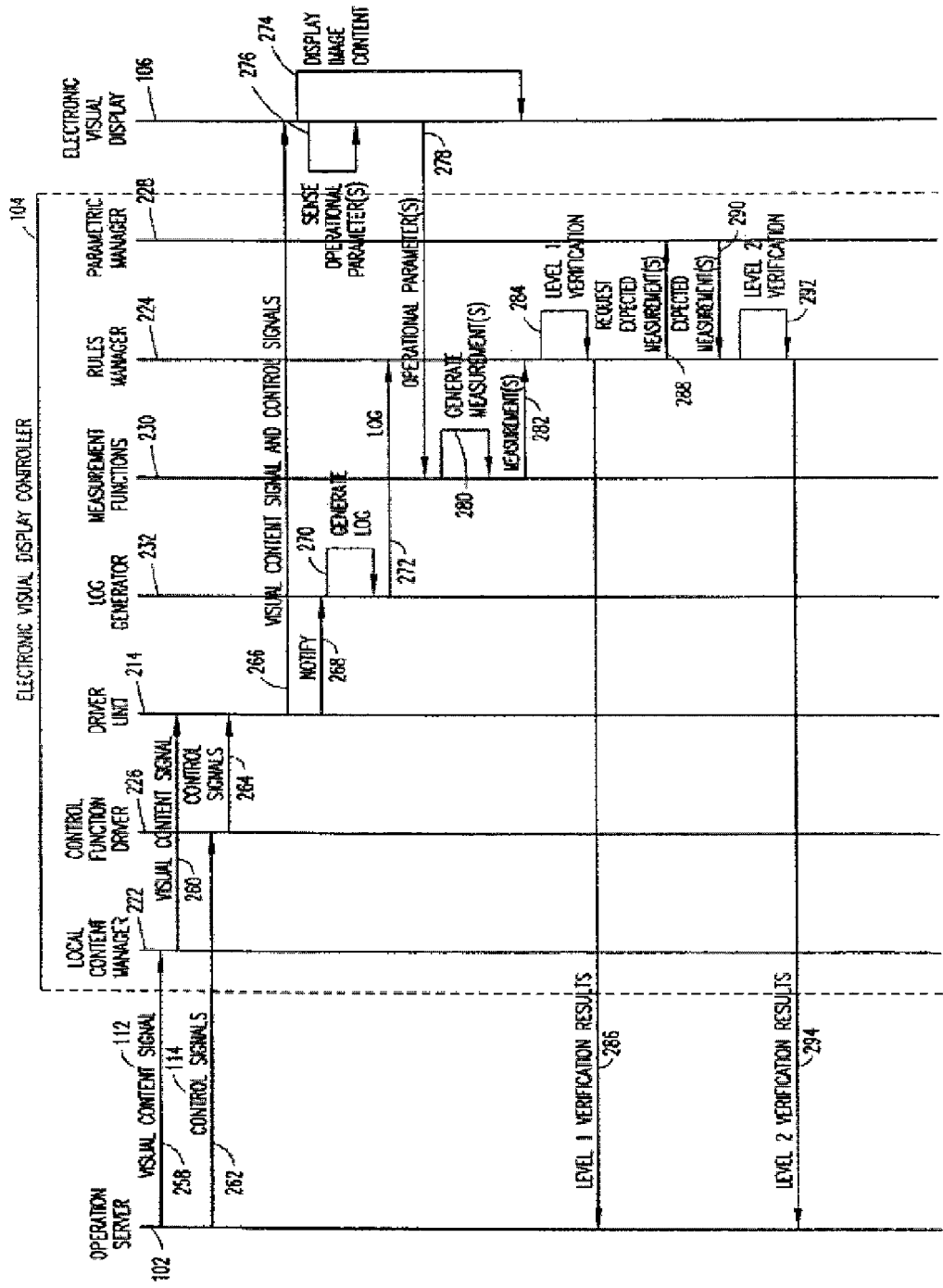
FIG. 2D is an exemplary interaction diagram for describing a more detailed series of events between the system components of FIGS. 1 and 2.
Figure 4A:
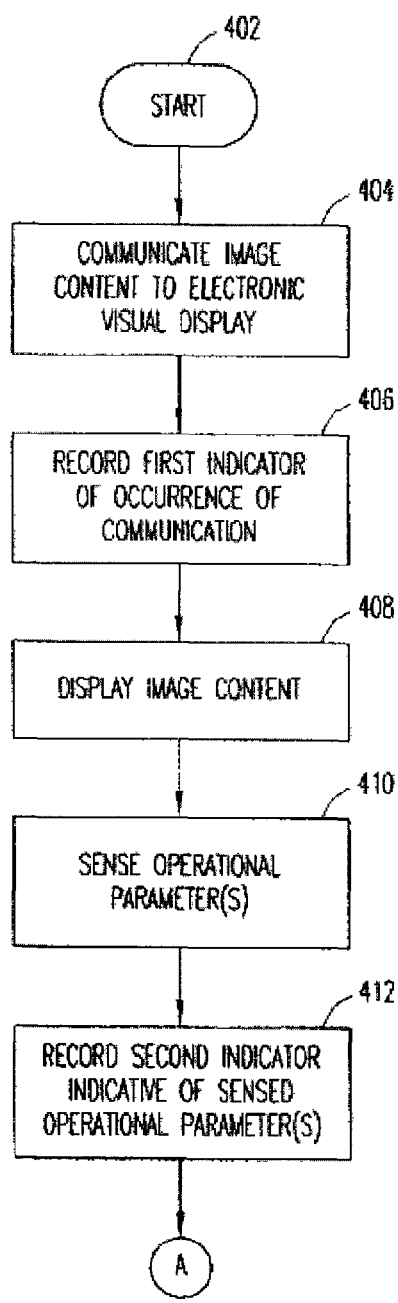
FIG. 4A is an exemplary flow diagram providing verification level 1 of the visual content being displayed on the electronic visual display of FIGS. 1 and 2.
Figure 4B:
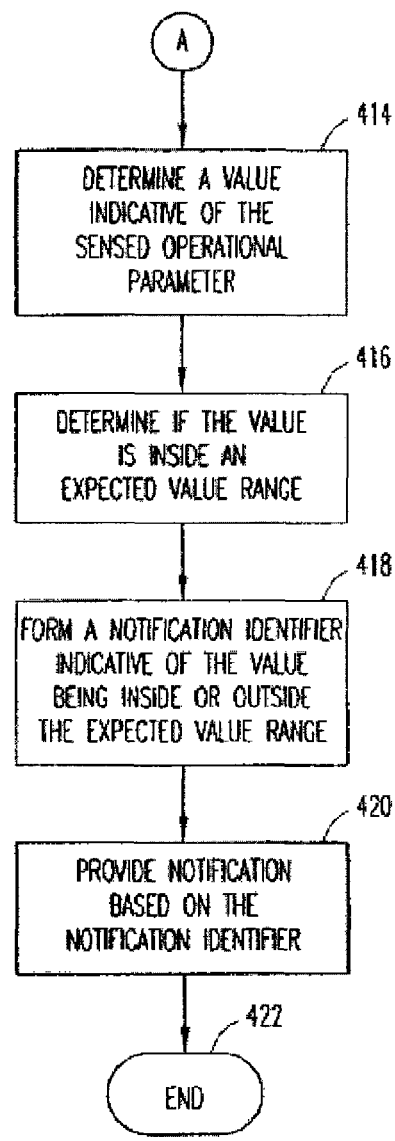
FIG. 4B is an exemplary flow chart of a verification level 2 process that may be executed on the system of FIG. 1.

FIG. 2D is an exemplary interaction diagram for describing a more detailed series of events between the system components of FIGS. 1 and 2 and in accordance with FIGS. 4A-4B. As shown, the operation server 102, electronic visual display controller 104, and electronic visual display 106 are provided. The electronic visual display controller 104, however, is formed of the components of the software 220 to show communications therebetween to provide for the verification levels 1 and 2. At step 258, the operation server 102 communicates the visual content signal 112 to the electronic visual display controller 104. At the electronic visual display controller 104, the local content manager 222 receives the visual content signal 112 and stores and/or further communicates the visual content signal 112 to the driver unit 214 at step 260. Additionally and/or simultaneously, the operation server 102 communicates the control signals 114 at step 262 to the electronic visual display controller 104, which utilizes the control function drivers 226 to process the control signals 114. At step 264, the control signals 114 are communicated to the driver unit 214.

At step 266, the driver unit 214 communicates both the visual content signal 112 and the control signal 114 to the electronic visual display 106. In response to the visual content signal 112 being communicated to the electronic visual display 106, the driver unit 214 provides a notification to the log generator 232 at step 268. At step 270, the log generator 232 generates a log of the communication of the visual content signal 112 to the electronic visual display 106. The log may include the date, time, name of visual content associated with the visual content signal 112, and/or other relevant information indicative of the communication of the visual content signal 112 to the electronic visual display 106. At step 272, the log of the communication of the visual content signal 112 to the electronic visual display 106 is communicated from the log generator 232 to the rules manager 224. The rules manager 224 may utilize the log information for performing verification of the visual content signal 112 being displayed on the electronic visual display 106.

At step 274, the electronic visual display 106 displays image content represented by the visual content signal 112. At step 276, operational parameter(s) of the electronic visual display 106 are sensed. Sensing of the operational parameter(s) at step 276 provides an indication that the electronic visual display 106 is operating and/or operating properly. Alternatively, a test pattern may be provided to the electronic visual display 106 prior to the displaying of the visual content and sensing of operational parameter(s) to provide an indication that at or around the time of the visual content being displayed that the electronic visual display 106 is operating properly.

At step 278, the sensed operational parameter(s) are communicated from the electronic visual display 106 to the measurement functions 230 of the electronic visual display controller 104. The sensed operational parameter(s) may be communicated via the operational data 116 in an analog and/or digital format. The measurement functions 230 generate measurement(s) at step 280. It should be understood that if the operational data 116 is in digital format, then the measurement(s) may be generated by the electronic visual display 106. Alternatively, if the operational data 116 is in analog format, then the measurement functions 230 may perform the measurement(s) (i.e., determine values associated with the sensed operational parameter(s)).

At step 282, the measurement functions 230 communicate the measurement(s) to the rules manager 224. At step 284, verification level 1 is performed by associating the log information from step 272 and the measurement information from step 282. It should be understood, however, that a variety of verification level 1 determinations may be performed. For example, the rules manager 224 may utilize various sensed operational parameters and log data in performing the verification level 1. At step 286, the verification level 1 results are communicated to the operation server 102 by the electronic visual display controller 104. The operation server 102 may store the verification level 1 results in the log database 110c for providing the operator and/or content provider assurance that the image content was displayed on the electronic visual display 106 both timely and properly.

Verification level 2 of the image content being displayed properly by the electronic visual display 106 starts at step 288 where a request of expected measurement(s) from the rules manager 224 to the limit table manager 228 is performed. At step 290, the limit table manager 228 communicates the expected measurement(s) to the rules manager 224. The rules manager 224 may perform a comparison between the actual measurement(s) of the sensed operational parameter(s) and the expected operational parameter measurement(s) (or range thereabout). The log information additionally may be correlated with the results of actual and expected operational parameter measurement(s) comparison in determining the verification level 2 at step 292. At step 294, the verification level 2 results are communicated from the electronic visual display controller 104 to the operation server 102. The verification level 2 results may be stored in the log database 110c by the operation server 102 for providing the operator and/or visual content provider assurances that the electronic visual display 106 displays the visual content both timely and properly.

Figure 3B:
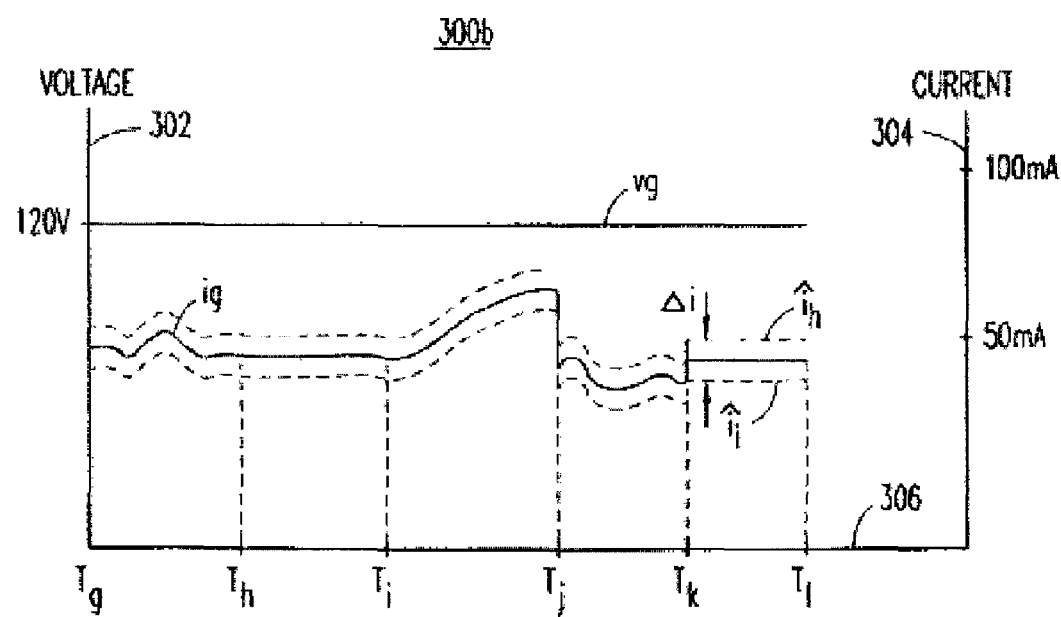
FIG. 3B is an exemplary graph providing a more detailed display of the voltage and current operational parameters of the electronic visual display of FIGS. 1 and 2.

FIG. 3B is an exemplary graph providing a more detailed display of the voltage and current operational parameters of the electronic visual display 106. As shown, the voltage operational parameter $v_g$ is shown over time period $T_g$-$T_l$ to be a substantially constant 120 volts. However, the current operational parameter $i_g$ is shown to be time varying. Between times $T_g$-$T_h$, where the current operational parameter $i_g$ varies in response to the visual content signal 112 being displayed on the electronic visual display 106. During time period $T_h$-$T_i$, the current operational parameter $i_g$ remains at a substantially constant 50 mA, which is indicative of a constant visual image being displayed on the electronic visual display 106. The current operational parameter $i_g$ is measured and compared to a map or range of the expected current operational parameter over time that varies with parameter or image changes on the electronic visual display 106.

If the current operational parameter $i_g$ falls within the range of $\hat{i}_h$ and $\hat{i}_i(\Delta i)$ bounding the expected current operational parameter, then it may be determined that a particular visual content signal 112 is displayed on the electronic visual display 106. Correlating the knowledge that the visual content signal 112 was communicated to the electronic visual display 106 by the log information further provides for the verification that a particular visual content was timely and properly displayed (i.e., verification level 2 was satisfied), assuming that if $i_g$ remains within the range over time, the image on the electronic visual display 106 is deemed properly displayed. Alternatively, matching the current operational parameter $i_g$ to an expected current operational parameter range (e.g., $\hat{i}_h$-$\hat{i}_i$ and time stamping the matching, the operator may inferentially determine that a particular visual content signal 112 is timely and properly displayed by the electronic visual display 106 (i.e., slightly less than verification level 2 is satisfied due to not logging proper delivery of the visual content).

Although the current operational parameter $i_g$ is provided on the graph 300b, it should be understood that any other operational parameter of the electronic visual display 106 may be measured and compared to an expected operational parameter. For example, color or brightness may be measured, whereby the measurement is utilized to determine whether it is properly displayed. As described with regard to FIG. 2, the electronic visual display controller 104 may perform the measurement and comparison functionality.

FIG. 4A is an exemplary flow diagram 400a providing verification level 1 of the visual content being displayed on the electronic visual display 106. The process starts at step 402. At step 404, the visual content signal 112, which may be analog or digital, is communicated via a wired or wireless communication channel to the electronic visual display 106. In one embodiment, wireless ethernet using the 802.11b standard may be utilized. Alternatively, satellite wireless communication may be utilized either indirectly or directly to the electronic visual display controller 104. Depending upon the configuration of the system, the fact that the visual content signal 112 is provided to the electronic visual display controller 104 from the operation server 102 may be sufficient to consider that the visual content is displayed on the electronic visual display 106. Alternatively, a communication from the electronic visual display controller 104 to the electronic visual display 106 may be utilized in verifying that the visual content is displayed on the electronic visual display 106.

At step 406, a first indicator of the occurrence of the communication of the visual content signal 112 is recorded. The first indicator may be established in response to the visual content signal 112 being communicated from the operation server 102 to the electronic visual display controller 104 or from the electronic visual display controller 104 to the electronic visual display 106 depending on the system configuration. In one embodiment, the first indicator includes a date and time. Other indicators may alternatively be recorded, including a flag indicative of the visual content signal 112 being communicated.

At step 408, the visual content is displayed on the electronic visual display 106 via the visual content signal 112. At least one operational parameter of the electronic visual display 106 is sensed at step 410. The operational parameter(s) may be any operational parameter that is available to be sensed by a conventional or custom designed sensor 254 for the electronic visual display 106. At step 412, a second indicator indicative of the sensed operational parameter(s) is recorded. The second indicator may be a measured value or an indicator that is indicative of the fact that the operational parameter(s) are operating in a normal range. For example, the voltage operational parameter of the electronic visual display 106 may be verified to have been operating at 120±5 volts. By associating or combining the knowledge that the first and second indicators are valid, verification level 1 may be satisfied for the operator of the electronic visual display 106 and/or the provider of the visual content. The verification level 1 process ends at step A.

FIG. 4B is an exemplary flow chart of a verification level 2 process. The process starts at step A, which extends from the verification level 1 process of FIG. 4A. At step 414, a value indicative of the sensed operational parameter is determined. In other words, a measurement of the sensed operational parameter produces a measured value corresponding thereto. Verification level 2 may additionally measure the time-varying operational parameter at multiple times for determination purposes. At step 416, a determination is made if the measured value is inside an expected measured value range. At step 418, a notification identifier indicative of the measured value being inside or outside the expected measured value range is formed. If the measured value is inside the expected measured value range, then the notification identifier may be set to a value of "1" or logical TRUE. If the measured value is outside the expected measured value range, the notification identifier may be a "0" or logical FALSE. At step 420, a notification based on the notification identifier is communicated. In one embodiment, the notification may be communicated from the electronic visual display 106 to the electronic visual display controller 104. Alternatively, the notification may be that from the electronic visual display controller 104 to the operation server 102. The process ends at step 422. It should be understood that each of the indicators and identifiers may be stored in the log database 110c of the operation server 102.

TABLE 1 is an exemplary log table containing logs for verification levels 1 and 2. As shown, a number of different data elements indicative of the delivery of the visual content signal 112 and measurement of operational parameters are stored. Examples of such data elements are delivery/playtime of the visual content signal 112, content identifier, content name, operational parameters, and verification identifier. The delivery/playtime may include a date and time that the visual content signal 112 is delivered from the operation server 102 to the electronic visual display controller 104 or from the electronic visual display controller 104 to the electronic visual display 106. Since the delivery of the visual content signal 112 may only be performed once and then the display of the visual content signal 112 be repeated continuously at the electronic visual display 106, playtime may also be logged.

TABLE 1

| DELIVERY/PLAYTIME | | CONTENT | CONTENT | OPERATIONAL PARAMETERS | | | | | VERIFICATION |
|---|---|---|---|---|---|---|---|---|---|
| DATE | TIME | IDENTIFIER | NAME | TEMP | VOLTS | CURRENT | LIGHT | REFRESH | IDENTIFIER |
| Jun. 14, 2002 | 2:45 p.m. | 50286-03471 | Running Shoe | 96 | 120 | .5 | — | — | L1-PASS |
| Jun. 14, 2002 | 2:48 p.m. | 50286-03471 | Running Shoe | 98 | 122 | .58 | — | — | L1-PASS |
| Jun. 14, 2002 | 2:51 p.m. | 50286-03471 | Running Shoe | 110 | 32 | .01 | — | — | L1-FAIL |
| ... | | | | | | | | | |
| Jun. 21, 2002 | 8:30 a.m. | 28400-07056 | Snacks-Chips | 95 | 120 | .5 | 1.4 | 60 | L2-PASS |
| Jun. 21, 2002 | 8:35 a.m. | 28400-07056 | Snacks-Chips | 95 | 120 | .52 | 1.4 | 60 | L2-PASS |
| Jun. 21, 2002 | 8:40 a.m. | 28400-07056 | Snacks-Chips | 95 | 120 | .52 | 1.4 | 60 | L2-PASS |
| Jun. 21, 2002 | 8:45 a.m. | 28400-07056 | Snacks-Chips | 95 | 120 | .51 | 1.32 | 60 | L2-PASS |
| Jun. 21, 2002 | 8:50 a.m. | 28400-07056 | Snacks-Chips | 95 | 120 | .5 | 1.28 | 60 | L2-FAIL |
| ... | | | | | | | | | |
| Jun. 28, 2002 | 12:00 p.m. | Coca-Cola ® | Carbonated Beverage | 95 | 120 | .5 | 1.4 | 60 | L2-PASS |

The content identifier may be any identifier associated with the content provided by the visual content signal 112. For example, if the content is an advertisement that shows a running shoe, then the content identifier may be the uniform product code (UPC) associated therewith. Alternatively, the operator may assign a random or non-random alphanumeric value for the content identifier. The content name may be an identifier associated with the visual content or a provider of the content, for example. The operational parameters may include any operational parameter of the electronic visual display 106 that is measured or derived from the electronic visual display 106.

As shown, the operational parameters may include temperature, volts, current, light, and refresh rate. For the running shoe visual content, operational parameters are measured and stored in the log table each time the content is delivered and/or played. For example, on Jun. 14, 2002, at 2:45 p.m., the operating temperature of the electronic visual display 106 is 96 degrees Fahrenheit and the operating voltage is 120 volts with the electronic visual display 106 drawing a current of 0.5 amps (see, for example, FIG. 3A). As indicated by the verification identifier (right most column) being "L1-PASS", the delivery of the visual content signal 112 was successful and the electronic visual display 106 is deemed to be operational. The running shoe advertisement is displayed at three minute intervals (i.e., 2:45 p.m., 2:48 p.m., and 2:51 p.m.). However, while the electronic visual display 106 at 2:51 p.m. is deemed to be operational at 2:48 p.m., the operational parameters (volts and current) indicate a failure of the verification level 1 of the electronic visual display 106 as identified by the verification identifier (i.e., "L1-FAIL").

The log table further includes data associated with a second advertisement. As shown, on Jun. 21, 2002, at 8:00 a.m., a "snacks-chips" advertisement having a content identifier of 28400-07056, representative of the UPC number associated with the snack-chips product, is displayed. The operational parameters for the electronic visual display 106 include an additional parameter of light, which is derived from measuring a current operational parameter drawn by the picture tube, for example and utilizing factory setting parameters as understood in the art. The light operational parameter may be utilized by the electronic visual display 106, and more specifically by the limit table manager 228, to verify that the operational parameter is operating within an expected operational parameter range for the given time sample of the display of the visual content signal 112. In this case, the current measured has a corresponding light operational parameter of 1.4 Foot-Lamberts (FL). The range of expected light parameters may be set between 1.3 FL and 1.5 FL, so that the light operational parameter for the visual content displayed at 8:30 a.m. allows the rules manager 224 of the electronic visual display controller 104 to indicate that the display of the visual content signal 112 was acceptable from a verification level 2 standpoint. Accordingly, the verification identifier at 8:30 a.m. receives "L2-PASS". The carbonated beverage advertisement is displayed every 5 minutes and continues to receive "L2-PASS" indications until 8:50 a.m., where the light operational parameter falls outside the expected light operational parameter range with a value of 1.28 FL. Accordingly, the verification identifier is logged as being "L2-FAIL", which indicates a verification level 2 failure.

A third visual content is shown to be communicated to the electronic visual display 106 via the visual content signal 112 on Jun. 28, 2002 at 12:00 p.m. The content identifier is alphanumeric and spells the name of the manufacturer "Coca-Cola®" rather than using a uniform product code (UPC) number. As described in relation to FIG. 6, the content identifier may be utilized as a verification code to be displayed on the electronic visual display 106 to provide for verification levels 3 and 4. The delivery and operational parameters successfully met the verification level 2 conditions and, thus, a verification identifier of "L2-PASS" is logged.

It should be understood that rather than using a single log table to record both levels of verification that separate tables may be utilized to support each verification level. Additionally, it should be understood that one or more tables may be organized to record visual content being displayed on each electronic visual display 106, thereby providing the operator of the operations server 102 easier log manageability. It should also be understood that there may be more or fewer operational parameters than those shown in TABLE 1. While the operational parameters are shown to be static, the operational parameters may be provided in a more detailed or time-varying format, such as that shown in FIG. 3B. Datafile (s) containing expected time-varying recordation of operational parameter measurements that provides for signature analysis may be stored by the operation server 102 expected operational parameter database 110*d*. The software 220 may store the datafiles for lookup by the parametric limit table for control functions manager 228 and rules manager 224 for performing the verification process of verification level 2.

Verification levels 3 and 4 are based on a sensing technique that extends beyond conventional sensing of operational parameters. As understood in the art, conventional sensing of operational parameters in non-production operations (i.e., beyond factory testing operations) are limited to those parameters that may be measured electronically (i.e., voltage or current) within the electronic visual display 106. Again, in the case of determining the color or intensity of light for conventional systems, a current measurement is performed and a numerical conversion is performed utilizing factory established parameters as understood in the art to estimate the light produced by the electronic visual display 106. Techniques for performing verification levels 3 and 4 are described hereinafter.

To provide for content verification levels 3 and 4, a verification code (see, FIG. 6) may be generated and associated with or descriptive of the visual content that is displayed (see, FIG. 5). The verification code may be generated automatically or manually. If generated automatically, the verification code may be based on the name of the visual content datafile stored in the content database 110*a*. Alternatively, the verification code may be based on another identifier associated with the visual content, such as the UPC number or proprietary barcode number, product or service name, or other related information stored in the content database 110*a*.

The verification code is ultimately a binary word or multiple binary words to represent the information associated with the visual content. For example, an ASCII letter "G" may be represented as 7/H (hexadecimal or $01000111_2$ binary). Alternatively, the verification code may be an alphanumeric identifier generated by the content provider or operator of the operation server 102. For example, the alphanumeric identifiers may be generated over time or for successive image frames, either serially (e.g., C001, C002, C003, etc.) or randomly (e.g., XP483, YN248, 32A3N, etc.), without repeating values, or, alternatively, used on a limited predetermined basis to form the verification code. Still yet, time and date may be included in generating unique verification codes for the associated visual content. For example, a verification code may include a product name, date, time, and/or identifier of an electronic visual display 106. If the verification code is generated manually, the same or similar information utilized to automatically generate the verification code may be used. It should be understood that the verification code may be generated at the operation server 102, electronic visual display controller 104, electronic visual display 106, or a combination thereof.

Figure 11:
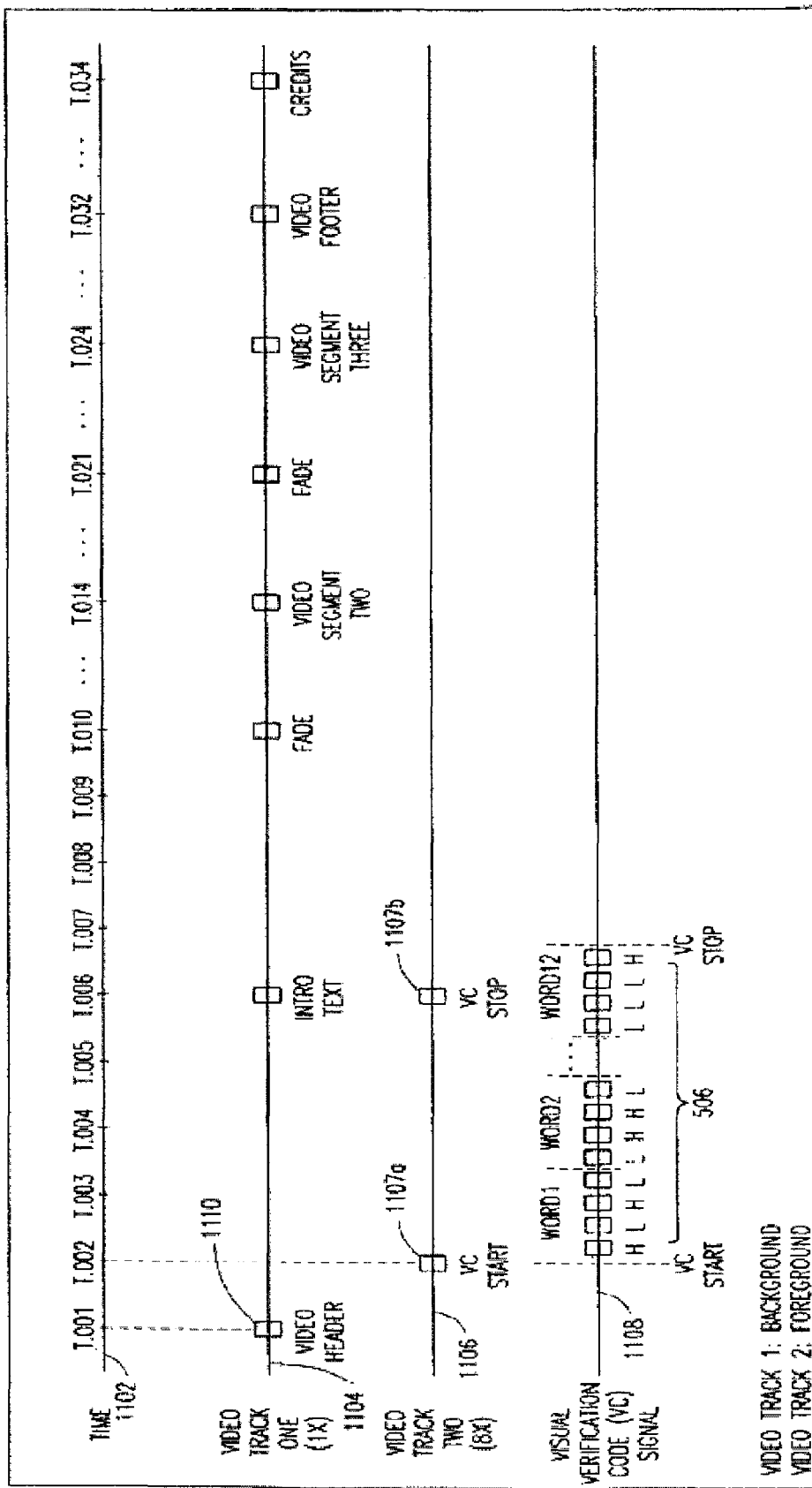
FIG. 11 provides a graphical user interface of an exemplary video production software tool that may be operated on the operation server to apply a verification code to the associated visual content for display by the system of FIG. 1.

In practice, a number of techniques may be utilized to generate and apply the verification code to be displayed on the electronic visual display 106. One embodiment includes utilizing a software tool for producing video content. One such software tool is Macromedia Director™. FIG. 11 provides a graphical user interface 1100 of an exemplary video production software tool that may be operated on the operation server 102 to apply a verification code to visual content. As shown, a timeline 1102 provides for synchronization of the verification code with the visual content for display on the electronic visual display 106. A first video track 1104 may contain start and stop signals 1107*a*, 1107*b*, for the visual content and a second video track 1106 may contain the verification code as established on a third track 1108, which is not displayed, via a visual verification code signal (see, FIG. 5). For example, a visual content (e.g., video) containing an advertisement for a pair of running shoes may be set on the first video track 1104 and a verification code, represented by the visual verification code signal 506 (e.g., video clip of a 5×5 pixel image formed of ON and OFF levels, such as black and white colors) may be placed on the second video track 1106. The visual verification code signal 506 may be synchronized in relation to the visual content signal so as to be near the video header 1110. In other embodiments, the visual verification code signal 506 may start prior to, during, or after the visual content signal 112. In the case of the visual verification code signal 506 being displayed during the visual content signal 112, the visual verification code signal 506 may overlay or be placed in the foreground of a portion of the visual content signal being displayed as understood in the art.

Another embodiment for generating and/or applying the verification code to be displayed via a visual verification code signal 506 includes software or hardware operated by the operation server 102, electronic visual display controller 104, electronic visual display 106, either individual or by a combination thereof. The software and/or hardware may apply to visual verification code signal 506 to either an analog or digital video signal containing content. The digital video signal may be MPEG-1, -2, or -4, or any other digital video signal format supported by a communication system.

In the case of the visual content signal being analog, synchronization pulses indicating the beginning of lines and fields (i.e., horizontal and vertical synchronization) as understood in the art may be utilized to insert the visual verification code signal. In one embodiment, an on-screen display or video pattern generator, such as those used to generate an on-screen menu guide, may be utilized to insert the visual verification code signal onto the visual content signal 112 being displayed by the electronic visual display 106. For example, at a specific line and column based on the synchronization pulses, the visual content signal 112 being delivered to or displayed by the electronic visual display 106 is switched to the visual verification code signal. To accomplish the switching of the signals, an on-screen display (OSD) chip as understood in the art may be utilized.

In the case of the visual content signal 112 being converted to digital by any of the operation server 102, electronic visual display controller 104, or electronic visual display 102, a variety of techniques may be utilized to display the visual verification code signal in association with the visual content signal 112. Three such techniques include (1) using the same or similar technique as discussed above with regard to insertion of the visual verification code signal by counting the synchronization pulses in conjunction with a video pattern generator, (2) forming a data stream of images of the visual content in memory and applying or overwriting the visual verification code signal onto the proper locations in the memory such that the verification code is displayed at a desired location on the electronic visual display 106, or (3) performing real-time insertion of the visual verification code signal 506 into the visual content signal 112 utilizing video mixing equipment as understood in the art. Again, by displaying the verification code, verification levels 3 and 4 may be enabled.

FIG. 5 provides a number of exemplary embodiments for utilizing an optical sensor for measuring illumination of a verification code. FIG. 5A(1) provides an exemplary electronic visual display 106 having an optical sensor 504 coupled thereto for sensing illumination of a display region 505 identified within dashed lines for displaying a visual verification code signal 506 on the screen 507 of the electronic visual display 106. The optical sensor 504 may be electronic or any other type of sensor (e.g., photodiode, phototransistor, and solar cell) capable of sensing illumination of the visual verification code signal 506 by the electronic visual display 106. In one embodiment, the optical sensor 504 is one produced by Panasonic Corporation and identified as a part number PN335.

As can be seen on the front view of the electronic visual display 106a of FIG. 5A(1), the optical sensor 504 is disposed within the area or region 505 formed to display the visual code verification signal 506. To reduce optical noise during sensing by the optical sensor 504, including simultaneous display of the visual content and ambient lighting conditions, the optical sensor 504 should have a field-of-view no greater than the display region 505 for displaying the visual verification code signal 506.

The optical sensor 504 may be coupled to the screen 507 using adhesives or other non-permanent or permanent securing materials. FIG. 5A(2) shows a front isometric view of the electronic visual display 106 having the optical sensor coupled to the screen 507. The optical sensor as shown does not have any wires for communicating the signal sensed by illumination from the visual code signal 506, but rather utilizes a wireless communication device (not shown) coupled to the optical sensor 504. In one embodiment, the wireless communication device is produced by Radiotronix, Inc. and having part number rtc-433-as.

FIG. 5B(1) is a front view of the electronic visual display 106 that provides an alternative embodiment for coupling the optical sensor 504 to the electronic visual display 106 for illumination by the visual verification code signal 506. In this embodiment, a bracket member 508 may be coupled to the housing 509 of the electronic visual display 106 using adhesives or other fastening techniques as understood in the art. As shown in FIG. 5B(2), the support member 508 is curved and disposes the optical sensor 504 in a position to be illuminated by display of the visual verification code signal 506. Alternatively, the optical sensor 504 may be mounted to a support member that is not directly coupled to the housing of the electronic visual display 106. In another embodiment, a mirror, light pipe, optical fiber, or another light reflection device may be utilized to project the illumination of the visual verification code signal 506 onto the optical sensor 504 that is remotely associated with the electronic visual display 106. For some display types having rear projection systems, the optical sensor 504 may be placed behind the viewing screen. For a front projection system, the optical sensor 504 may be placed at the display plane (e.g., screen) or within the projector itself.

FIG. 5C(1) is a front view of the electronic visual display 106a showing that the optical sensor 504 is not positioned externally in front of the display region 505 on the screen 507. As shown on FIG. 5C(2), the optical sensor 504 is disposed within the electronic visual display 106 and behind the screen 507 by coupling the optical sensor 504 by support member 508, which is further coupled to the housing 509 of the electronic visual display 106b. To illuminate the optical sensor with the visual verification code signal 506, a mirror 510 reflects the visual code signal 506 onto the optical sensor 504. It should be understood that a beam splitter may alternatively be used to reflect the visual code signal 506 onto the optical sensor 504 so that at least a portion of the visual verification code signal 506 or other visual content signal 112 is displayed on the screen 507 to reduce distraction in viewing of the electronic visual display 106.

Another embodiment for utilizing the optical sensor 504 is an outdoor display utilizing LED and LCD devices (e.g., electronic billboard). Outdoor LED displays may utilize LED bulbs, as understood in the art, where the LED bulbs include multiple light emitting diodes to produce multiple colors from a single LED bulb. To ensure that the electronic billboard is operating properly, the optical sensor 504 may be coupled to a portion or all of the LED bulbs. Alternatively, the optical sensor 504 may be or disposed to receive the illumination from some or all of the LED bulbs. Accordingly, by sensing the illumination being displayed from the LED bulbs, verification of content and/or display parameters (e.g., color, intensity, etc.) of the outdoor display may be performed. The optical sensor 504 may be utilized similarly with an LCD display.

Yet another embodiment for utilizing the principles of the present invention includes a video display wall, where multiple electronic visual displays 106 form a large, single electronic visual display. In such a case, each individual electronic visual display 106 may have the optical sensor 504 or other feedback mechanism(s), as previously discussed, so as to ensure the proper operation of each individual electronic visual display 106.

FIG. 6 is an exemplary graph 600 for showing a digital verification code signal 602 representative of a content identifier (TABLE 1), which may be utilized to form a verification code associated with a visual content signal 112. The digital verification code signal 602 is formed of 48 bits having four (4) bits per word. The time segments $T_0$-$T_{48}$ represent the time segments for each bit. For example, bit-0 extends between times $T_0$-$T_1$, bit-1 extends between times $T_1$-$T_2$, bit-2 extends between times $T_2$-$T_3$, and bit-3 extends between times $T_3$-$T_4$. Word 1, therefore, forms the hexadecimal number $5_H$, (i.e., binary number $0101_2$). Word 2, forms a hexadecimal number of $6_H$ (i.e., $0110_2$) and word 12 forms the hexadecimal number $8_H$ (i.e., $1000_2$). It should be understood that the digital verification code signal 602 may be formed of words having fewer or more than 4-bits. For example, if alphanumeric or ASCII code values are desired to be utilized for the verification code, then 8-bit words may be utilized, thereby providing a potential of 256 values for each character.

In displaying the digital verification code signal 602 as a visual verification code signal 506, the bits are displayed in series (i.e., bit-0, bit-1, bit-2, bit-3, etc.). The bits may be synchronized with the visual content signal 112 according to the frame and/or refresh rate of the electronic visual display 106. It should be further understood that other modulation techniques may be utilized to represent the verification code. For example, pulse width modulation (PWM) may be utilized such that percentage of a word that is HIGH may be utilized in forming different levels or average values that represent characters of the verification code.

FIGS. 7A(1)-7D(1) are a sequence of images that illustrate the digital verification code signal 602 being displayed as a visual verification code signal 506 on the electronic visual display 106. FIGS. 7A(1)-7D(1) show a sequence of the 4-bits representative of word 1 of the digital verification code 602 of FIG. 6. Between times $T_0$ and $T_1$, the visual verification code signal 506a is highlighted, thereby indicating that the bit between times $T_0$ and $T_1$ of the digital verification code signal 602 is HIGH. FIG. 7B(1) has the visual verification code signal 506b being unhighlighted, thereby indicating that the second bit (i.e., bit-1) of the digital verification code signal 602 is LOW between times $T_1$ and $T_2$. FIG. 7C(1) again has the visual verification code signal 506a being indicated as highlighted thereby representing that the third bit of the digital verification code signal 602 is HIGH. FIG. 7D(1) shows the visual verification code signal 506b as being unhighlighted, thereby indicating that the fourth bit of the digital verification code signal 602 is LOW. By sensing the illumination of the visual verification code signal 506 from each frame provided by FIGS. 7A(1)-7D(1), a determination may be made that the verification code being represented by the digital verification code signal 602 and displayed by the visual verification code signal 506 is a hexadecimal number $5_H$ (i.e., $0101_2$).

FIGS. 7A(2)-7D(2) are a sequence of images that illustrate the digital verification code signal 602 being displayed as a combination of values (e.g., HIGH and LOW). The visual region 505 is formed of a visual verification code signal 506c having two half-regions being inverse from one another. In other words, to represent a HIGH value, shown on FIG. 7A(2), the left half 506e of the visual verification code signal 506c is highlighted and the right half 506f is unhighlighted. FIG. 7B(2) shows a low bit of the digital verification code signal 602, whereby the right half 506f of the visual verification code signal 506d is highlighted and the left half 50e is unhighlighted. By using a pair of sensors (see, FIG. 8A) being configured electronically as a differential pair, optical noise from ambient lighting conditions may be reduced in sensing the visual verification code signal 506 illuminated by the electronic visual display 106. It should be understood that other configurations and/or patterns generated to represent a HIGH value and a LOW value of the digital verification code signal 602 may be utilized for sensing purposes.

Further, the HIGH and LOW colors may be other than black and white. For example, an operator may desire to verify that the colors (i.e., red, green, blue) of the electronic visual display 106 are operating properly. To verify the colors, the visual verification code signal 506 may be cycled or selectively turned on independent of the other colors to verify that (i) each color is operating and (2) the intensity of each color is balanced with respect to the other colors. Still yet, the visual verification code signal 506 may be formed to appropriately match other colors surrounding the content identification region to minimize distraction for the viewer as the visual verification code signal 506 is being displayed by the electronic visual display 106. Another technique for verifying the colors may include applying the colors simultaneously with the substantially same or different intensities and measured accordingly. Sensing and measuring the visual verification code signal 506 may be performed as discussed with regard to FIGS. 8A and 8B.

Figure 8A:
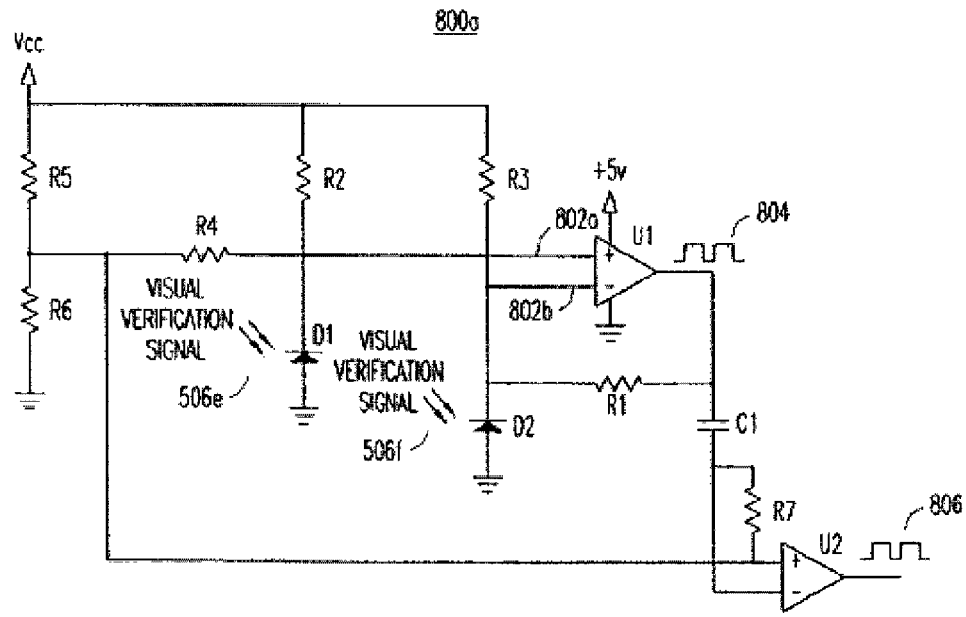
FIG. 8A is an exemplary circuit for sensing the visual verification code signals as shown in FIG. 7B and perform color balance measurements in a serial manner.

FIG. 8A is an exemplary circuit 800 for sensing the visual verification code signals 506c and 506d as shown in FIG. 7B. Optical sensors D1 and D2 are disposed or positioned to be illuminated by the left-half 506e and right-half 506f of visual verification signals 506c and 506d, respectively. A subtractor circuit may be electrically coupled, directly or indirectly, the output of the optical sensors D1 and D2 and utilized to generate a sensed visual verification difference signal 804. More specifically, an operational amplifier U1 is configured to have input terminals 802a and 802b coupled to the outputs of the optical sensors D1 and D2, respectively, and is operable to form a sensed visual verification difference signal 804. A second operational amplifier U2 may be utilized to amplify the sensed visual verification difference signal 804 to form a sensed visual verification code signal 806. As understood in the art, a single optical sensor D1 may be utilized to measure a mono-visual verification code signal 506 as provided in FIG. 7A. Accordingly, the use of a single optical sensor D1 would not utilize a subtractor optical operational amplifier U1 to form the sensed visual verification code 806. It should be further understood that rather than using a hardware circuit to perform processing of the visual verification code signal 506 sensed by the optical sensors D1 and D2, that a processor executing software to perform the processing may alternatively be used.

The differential configuration of the optical sensors D1 and D2 may be utilized to detect a difference between the visual verification code signal 506 in a split format as shown in FIG. 7B. This configuration, however, may not provide for determining color balance between multiple colors, such as red, green, blue, which are the primary or component colors of the electronic visual display 106, in a parallel and time-sequential manner. To determine the color balance of more than two colors in this dual-sensor configuration, a third color may be displayed for at least one cycle of the visual verification code signal 506. In other words, color balance may be determined by displaying and measuring multiple colors in a time-sequential manner.

Figure 8B:
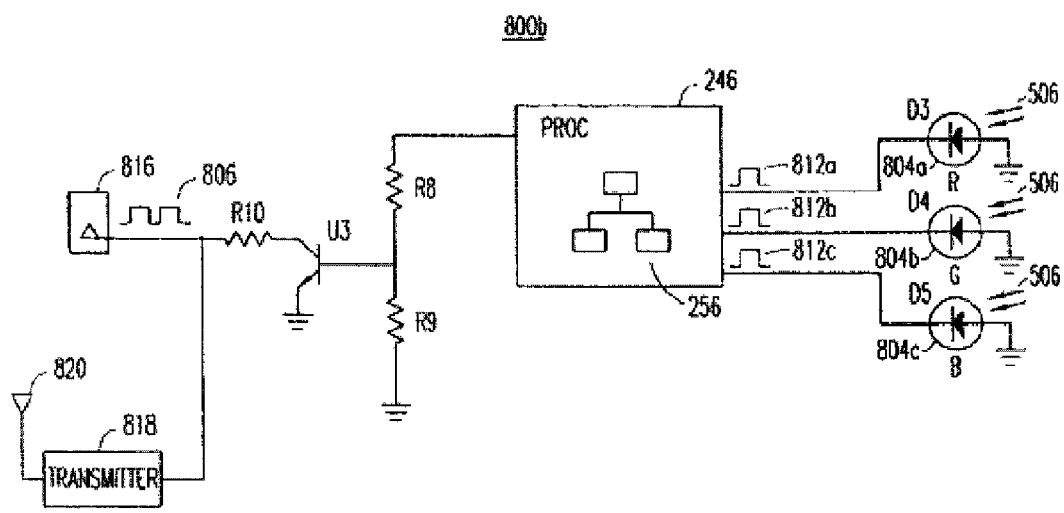
FIG. 8B is an exemplary circuit operable to sense the visual verification code signal and provide for color balance measurements of the visual verification code in a parallel manner as displayed on the electronic visual display of FIGS. 1 and 2.

FIG. 8B is an exemplary circuit 800b operable to provide for color balance measurements in a parallel manner. As shown, three optical sensors D3, D4, and D5 are utilized to measure independent colors of the visual verification code signal 506. The optical sensors D3-D5 may be configured such that each of the optical sensors D3-D5 is illuminated by the visual verification code signal 506 formed of each of the primary colors (i.e., red, green, blue). If the visual code signal 806 is balanced with each of the primary colors, then each of the optical sensors D3-D5 provides substantially the output voltage or current. To ensure that each of the optical sensors D3-D5 measures only specific colors, filters 804a-804c for each color may be utilized for each optical sensor D3-D5. As shown, D3 is configured to sense red light (R), optical sensor D4 is configured to sense green light (G), and optical sensor D5 is configured to sense blue light (B). In other words, by utilizing the filters 804a-804c, each optical sensor D3-D5 senses the respective color or frequency that the filters 804a-804c do not filter out from the visual verification code signal 506. It should be understood that non-primary colors formed of the primary colors may be displayed and measured utilizing the same or similar technique.

The processor 246 is electrically coupled to the optical sensors D3-D5 for receiving the outputs of the optical sensors D3-D5. Although the configuration of the optical sensors D3-D5 is shown to directly couple to the processor 246, it should be understood that other electrical components, such as D/A converters, may be coupled therebetween such that the optical sensors D3-D5 are still considered to be electrically coupled. The use of A/D converters allows the use of optical sensors D3-D5 with analog outputs and the processor 246 to receive the optical sensor output signals 812a-812c. Additionally, coupling between the optical sensors D3-D5 and the processor 246 may be performed wirelessly via a transmitter and a receiver as understood in the art.

The processor 246 executes the software 256, which may be utilized to measure or perform other functional operations. For example, the processor 246 may be utilized to verify that the optical sensor output signals 812a-812c from optical sensors D3-D5 are balanced with regard to color and intensity. The processor 246 may form an average intensity value to form a sensed visual verification code signal 806. Alternatively, three sensed visual verification code signals 806a-806c may be communicated for further processing. The sensed visual verification code signal 806 may be applied to a physical connector 816 for communication to the electronic visual display controller 104 via a wired connection or may be communicated via a transmitter 818 and antenna 820 in a wireless manner as understood in the art. In one embodiment, the sensed visual verification code signal 806 may be communicated to the electronic visual display controller 104 via the operational data 116. In another embodiment, the sensed visual verification code signal 806 may be communicated to the operation server 102 directly. It should be understood that the system configuration may be varied, but that the functionality and/or information being communicated remains the same or similar.

FIGS. 9A and 9B are exemplary timing diagrams for measuring the visual verification code signal 506 of FIGS. 6-7B in serial and parallel, respectively, for determining (a) the verification code contained in the visual verification code signal 506 and (b) color displayed of the visual content by the electronic visual display 106 for verification levels 3 and 4. FIG. 9A is illustrative of sensing the visual verification code signal 506 as a mono- or multi-region signal (see, FIGS. 7A and 7B). Because the use of a single optical sensor or differential pair of optical sensors D1 and D2 provides the ability to measure one or two colors simultaneously, to determine that the full range of colors of the electronic visual display 106 are being properly displayed and are balanced, the component colors (e.g., red, green, and blue) may be cycled for each of the words of the verification code provided by the digital verification code signal 602.

Each word of the digital verification code of FIGS. 9A and 9B is eight bits and represents ASCII code character "G" ($71_H$ or $01000111_2$). In FIG. 9A, each word of the visual verification code signal 506 that produce the sensed visual verification code words 804a, 804b, and 804c, are repeated in series for each color, red (between times $T_0$-$T_8$), green (between times $T_8$-$T_{16}$), and blue (between times $T_{16}$-$T_{24}$). However, it should be understood that there may be a variety of techniques for displaying the visual verification code signal 506 with different colors so as to be able to sense and measure the component or primary colors produced by the electronic visual display 106. For example, rather than repeating each word of the visual verification code signal 506 in a different color, the entire visual verification code signal 506 may repeat in each of the primary colors.

FIG. 9B shows the three optical sensors D3-D5 producing outputs of the sensed visual verification code signals 812a, 812b, and 812c, for the component colors red, green, and blue, respectively. As indicated, each of the colors are displayed via the visual verification code signal 506 simultaneously as the configuration of the three optical sensors D3-D5 provides for simultaneous measurement thereof. By performing a simultaneous measurement, the visual verification code signal 506 may be sensed to produce the sensed visual verification code signals 812a-812c over a shorter period of time than the sequential case of FIG. 9A. And, by being able to display the three component colors simultaneously, it may be possible to "blend" the colors to minimize distraction for the viewer.

Figures 10A, 10B:
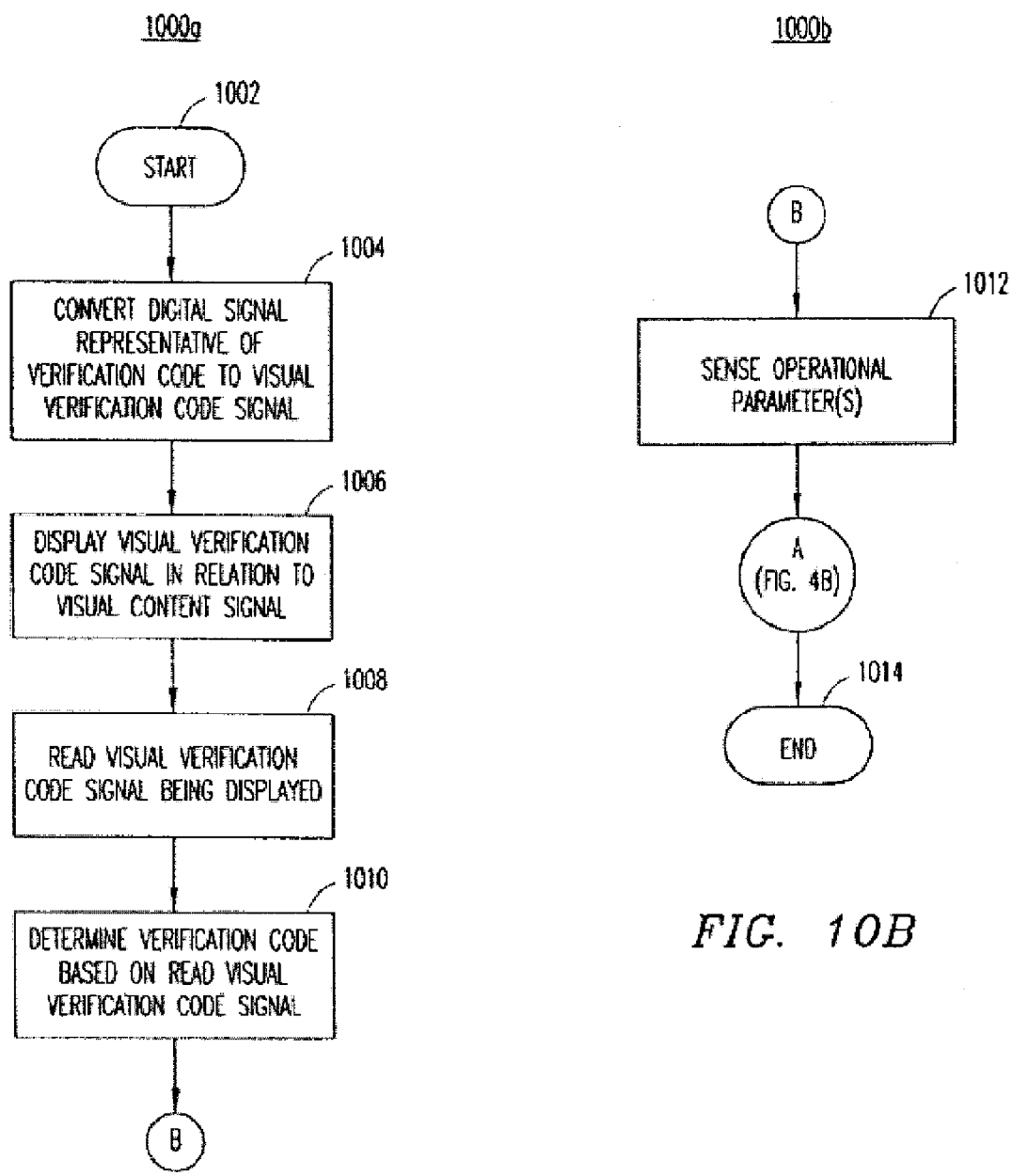
FIG. 10A illustrates a flow chart describing an operation for verification level 3 of the visual content being displayed on the electronic visual display of FIGS. 1 and 2.
FIG. 10B provides for verification level 4, which indicates that a particular visual content signal is timely and properly displayed on the electronic visual display.

FIG. 10A illustrates a flow chart 1000a describing an operation for the verification level 3 of the visual content being displayed on the electronic visual display 106. The process starts at step 1002. At step 1004, a digital signal representative of a verification code is converted to a visual verification code signal 506. The visual verification code signal 506 is displayed in relation to a visual content signal 112, where the visual verification code signal 506 may be displayed prior to, in conjunction with, or after the visual content signal 112. By displaying the visual verification code signal 506 in relation to the visual content signal, knowledge that a particular visual content signal 112 was displayed may be determined by measuring the visual verification code signal 506.

At step 1008, the digital verification code signal 602 displayed as a visual verification code signal 506 is read. In reading the visual verification code signal 506, the illumination of the visual verification code signal 506 may be sensed by optical sensors 504 and measured by circuitry and/or software. At step 1010, a verification code is determined based on the read visual verification code signal 506. The verification code is the code based on a content identifier and generated to form the digital verification code signal 602. By determining the verification code as represented by the visual verification code signal 506, a high level of certainty as to which visual content signal 112 displayed can be made for successfully providing verification level 3. The process for verification level 3 ends at step B.

FIG. 10B provides for verification level 4 which indicates that a particular visual content signal 112 is timely and properly displayed on the electronic visual display 106. The process starts at step B, which is an extension of the process of FIG. 10A. At step 1012, operational parameter(s) are sensed. In sensing the operational parameters, the optical sensor(s) 254 may be utilized to measure operational parameters of the electronic visual display 106. The process continues at step A of FIG. 4B so as to determine values of the sensed operational parameters and compare the sensed values with expected operational parameter values to determine (1) the quality of the visual content signal being displayed and (2) perform signature analysis of the operational parameter(s). In one embodiment, signature analysis may be performed by measuring each of the component colors displayed by the visual verification code signal 506. The process ends at step 1014.

An interaction diagram similar to that of FIG. 2D may be constructed to provide communication operations between various components for satisfying verification levels 3 and 4. However, as the steps would be similar or substantially the same as those shown in FIG. 2D in providing for the sensing of the visual verification code signal 506 utilizing the optical sensor 504, an interaction diagram is omitted, as one of ordinary skill in the art could produce such a diagram utilizing similar techniques.

While the principles of the present invention provide for feedback of parameters associated with the display of the content, it should be understood that feedback of parameters associated with audio may also be utilized in accordance with the principles of the present invention. In the case of feeding back audio parameters, measurements of audio characteristics rather than optical characteristics are performed. Such audio characteristics may include fidelity (e.g., static and interference), volume, range dynamics, etc.

In accordance with verification levels (1) and (2), measurement and knowledge of sensory information, such as audio, being communicated to an electronic device (e.g., the electronic visual display 106) may establish verification that the sensory information (e.g., audio and/or video) is properly communicated and output or played by the electronic device. A transducer or microphone (not shown) may be utilized to sense the audio produced by the electronic visual display 106 or, optionally, a remotely located radio. In one embodiment, the feedback of the audio measurements may be utilized to verify that the audio is operating properly. The feedback may additionally be fed-back to provide for the volume to automatically be adjusted to a particular level. For example, in the case of the electronic visual display 106 being located in an aisle of a grocery store, the volume may be adjusted to a predetermined level to enable individuals within a certain distance (e.g., eight feet) to hear the audio being produced by the electronic visual display 106.

In accordance with verification levels (3) and (4), an audio verification code may cause an audio verification code signal that may or may not be hearable by the human ear (i.e., at a very high or low frequency), but is capable of being produced by a sound system and measured by an audio sensor. The measurement of the audio verification code signal may be fed-back to the operation server 102 to verify that a particular audio and/or video content is played by the output device (e.g., radio or electronic visual display 106). To further improve the audio verification, speech recognition may be used to detect key words or phrases embedded into the audio content to "blend" the audio verification code into the content itself.

An audio selection flag may be established for each electronic visual display 106 at the operation server 102. If the operator of the electronic visual display 106 does not want to play the audio, the audio selection flag may be set to an OFF state, thereby preventing error conditions from being reported when the measurement of the audio signal from the electronic visual display 106 results in an OFF condition. Otherwise, an error condition may be reported and the operator may correct the audio problem manually, semi-automatically, or automatically.

The principles of the present invention may be utilized for many different applications. Such applications include, but are not limited to, remote management of electronic visual displays, such as CRTs and electronic billboards, verification of content distributed to electronic visual displays, certification of advertisements displayed on remotely located electronic visual displays, and certification of viewing specific television channels to automatically determine viewing ratings, such as those produced by the Nielsen ratings, to name a few. In the case of producing viewing ratings, the principles of the present invention may be utilized to eliminate the need to "sample" the public based on a few thousand viewers and measure actual viewers of potentially millions of viewers. In performing such viewing ratings, because the principles of the present invention provide for measuring illumination of the verification code, false readings of measuring a channel box without the television being turned on may be eliminated. It should be understood that many additional applications that utilize the principles of the present invention may be contemplated.

The previous description is of a preferred embodiment for implementing the invention, and the scope of the invention should not necessarily be limited by this description. The scope of the present invention is instead defined by the following claims.

What is claimed is:

1. A method for verifying display of visual content, said method comprising:
   communicating the visual content via a visual content signal to an electronic visual display for displaying between a start time and an end time;
   displaying the visual content signal between the start and end times;
   sensing an operational parameter of the electronic visual display between the start and end times;
   determining a sensed operational parameter value from the sensed operational parameter;
   determining whether the sensed operational parameter value is indicative of the visual content signal being properly displayed; and
   if the sensed operational parameter value is indicative of the visual content being properly displayed, recording an indicator indicative of the visual content being properly displayed by the electronic visual display, otherwise, recording an indicator indicative of the visual content not being properly displayed, the recorded indicator being available for determining whether the visual content was properly displayed.

2. The method according to claim 1, further comprising recording a second indicator indicative of the occurrence of the communication of the visual content signal to the electronic visual display to verify that the content signal was communicated to the electronic visual display.

3. The method according to claim 1, wherein determining whether the sensed operational parameter is indicative of the visual content being properly displayed includes comparing the sensed operational parameter value with an expected sensed operational parameter value range associated with the visual content.

4. The method according to claim 3, wherein said determining includes determining whether the visual content is substantially properly displayed based on the recorded indicator.

5. The method according to claim 1, wherein said communicating is performed via an analog transmission path.

6. The method according to claim 1, wherein said communicating is performed via a digital transmission path.

7. The method according to claim 1, wherein the start and end times represent the times for a single display of the visual content.

8. The method according to claim 1, wherein the start and end times represent the times between which the visual content is displayed multiple times.

9. The method according to claim 8, wherein the visual content is displayed multiple times if the visual content is dynamic.

10. The method according to claim 1, wherein said recording of the indicator is performed for each display of the visual content.

11. The method according to claim 1, wherein said sensing of the operational parameter is performed each time the visual content signal is displayed between the start and end times.

12. The method according to claim 1, wherein said recording of the indicator is performed each time said sensing occurs.

13. The method according to claim 1, further comprising determining a measured value indicative of the sensed operational parameter to form the recorded indicator.

14. The method according to claim 13, further comprising determining if the measured value indicative of the sensed operational parameter is inside an expected measured value range.

15. The method according to claim 14, further comprising forming a notification identifier indicative of the measured value indicative of the sensed operational parameter being inside or outside the expected range.

16. The method according to claim 1, further comprising forming a database having the recorded indicator being recorded therein.

17. The method according to claim 1, further comprising determining that the visual content was displayed based on the recorded indicator.

18. The method according to claim 1, wherein determining the sensed operational parameter value includes determining a plurality of operational parameter values between the start and end times, and wherein comparing the sensed operational parameter value includes comparing the sensed operational parameter values with an expected operational parameter profile associated with the visual content.

19. The method according to claim 18, wherein determining the sensed operational parameter values includes determining the sensed operational parameter values discretely over the entire duration between the start and end times.

20. The method according to claim 18, wherein determining the sensed operational parameter values includes determining the sensed operational parameter values continuously over the entire duration between the start and end times.

21. The method according to claim 1, wherein recording the indicator includes recording a Boolean flag.

22. The method according to claim 1, wherein recording the indicator includes recording an indicator uniquely associated with the visual content.

23. The method according to claim 1, wherein not being properly display includes not being displayed.

24. The method according to claim 1, further comprising:
generating a timestamp in association with displaying the visual content;
recording the timestamp; and
associating the recorded timestamp with the recorded indicator.

25. The method according to claim 1, further comprising determining that the visual content was displayed with substantially correct colors based on the recorded indicator.

26. The method according to claim 1, further comprising generating a report showing a first indicia representative of the visual content and a second indicia indicative that the visual content was properly displayed.

27. A system for verifying display of visual content, said system comprising:
means for communicating the visual content via a visual content signal to an electronic visual display for displaying between a start time and an end time;
means for displaying the visual content signal between the start and end times;
means for sensing an operational parameter of the electronic visual display between the start and end times;
means for determining a sensed operational parameter value from the sensed operational parameter;
determining whether the sensed operational parameter value is indicative of the visual content signal being properly displayed; and
means for recording an indicator indicative of the visual content being properly displayed by the electronic visual display if the sensed operational parameter value is indicative of the visual content being properly displayed or recording an indicator indicative of the visual content not being properly displayed if the sensed operational parameter value is not indicative of the visual content being properly displayed.

28. The system according to claim 27, further comprising means for determining whether the sensed operational parameter is indicative of the visual content being properly displayed.

29. The system according to claim 28, wherein said means for determining includes means for determining whether the visual content is substantially properly displayed based on the recorded indicator.

30. The system according to claim 27, further comprising means for determining if the sensed operational parameter value is inside an expected measured value range.

31. The system according to claim 30, further comprising means for forming a notification identifier indicative of the sensed operational parameter value being inside or outside the expected measured value range.

32. The system according to claim 27, further comprising means for storing the recorded indicator in a database.

33. A system for verifying display of visual content on an electronic visual display, said system comprising:

a processing unit operable to receive a communication of the visual content via a visual content signal and to display the visual content between a start time and an end time;

a video display driver on the electronic visual display operable to display the visual content signal between the start and end times;

a sensor configured to sense an operational parameter of the electronic visual display between the start and end times;

said processor further configured to:
  determine a sensed operational parameter value from the sensed operational parameter;
  determine whether the sensed operational parameter value is indicative of the visual content signal being properly displayed; and
  if the sensed operational parameter value is indicative of the visual content being properly displayed, record an indicator indicative of the visual content being properly displayed by the electronic visual display,
  otherwise, record an indicator indicative of the visual content not being properly displayed, the recorded indicator being available for determining whether the visual content was properly displayed.

34. The system according to claim 33, wherein said sensor is at least one of a voltage and a current sensor.

35. The system according to claim 33, wherein said processing unit is further configured to record a second indicator indicative of the occurrence of the communication of the visual content signal to the electronic visual display, and wherein the second indicator includes information associated with the visual content.

36. The system according to claim 35, wherein the second indicator includes a timestamp.

37. The system according to claim 33, wherein the recorded indicator is at least one of a voltage and current measured value.

38. The system according to claim 33, further comprising determining if the sensed operational parameter value is within an operating parameter range.

39. The system according to claim 33, wherein said processing unit is further configured to form a results value indicative of the results of said determining.

40. The system according to claim 33, further comprising a database including the first and second indicators.

41. The system according to claim 33, wherein said processing unit is further configured to determine that the visual content was displayed based on the recorded indicator.

42. The system according to claim 33, wherein said processing unit is further configured to:
  determine a plurality of operational parameter values between the start and end times; and
  compare the determined operational parameter values with an expected operational parameter profile associated with the visual content.

43. The system according to claim 42, wherein said processing unit is further configured to determine the determined operational parameter values discretely over the entire duration between the start and end times.

44. The system according to claim 42, wherein said processing unit is further configured to determine the determined operational parameter values continuously over the entire duration between the start and end times.

45. The system according to claim 33, wherein the recorded indicator is a Boolean flag.

46. The system according to claim 33, wherein the recorded indicator is uniquely associated with the visual content.

47. The system according to claim 33, wherein not being properly display includes not being displayed.

48. The system according to claim 33, wherein said processing unit is further configured to:
  generate a timestamp in association with displaying the visual content;
  record the timestamp; and
  associate the recorded timestamp with the recorded indicator.

49. The system according to claim 33, wherein said processing unit is further configured to determine that the visual content was displayed with substantially correct colors based on the recorded indicator.

50. The system according to claim 33, further comprising a report showing a first indicia representative of the visual content and a second indicia indicative that the visual content was properly displayed.

* * * * *